United States Patent
Yerramalli et al.

(10) Patent No.: US 11,102,763 B2
(45) Date of Patent: Aug. 24, 2021

(54) TECHNIQUES FOR MULTIPLEXING OF UPLINK CHANNELS IN A SHARED RADIO FREQUENCY SPECTRUM BAND

(71) Applicant: QUALCOMM Incorporated, San Diego, CA (US)

(72) Inventors: Srinivas Yerramalli, San Diego, CA (US); Chih-Hao Liu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/212,402

(22) Filed: Dec. 6, 2018

(65) Prior Publication Data

US 2019/0182826 A1    Jun. 13, 2019

Related U.S. Application Data

(60) Provisional application No. 62/596,757, filed on Dec. 8, 2017.

(51) Int. Cl.
*H04W 72/04*    (2009.01)
*H04L 5/00*    (2006.01)
*H04W 16/14*    (2009.01)

(52) U.S. Cl.
CPC ....... *H04W 72/0413* (2013.01); *H04L 5/0044* (2013.01); *H04L 5/0048* (2013.01);
(Continued)

(58) Field of Classification Search
CPC ....... H04L 1/08; H04L 1/1671; H04L 1/1858; H04L 5/0055; H04L 1/1854;
(Continued)

(56) References Cited

U.S. PATENT DOCUMENTS 8,483,150 B2 * 7/2013 Chun ................ H04L 1/0027
                                                        370/329
9,749,968 B2 * 8/2017 Stern-Berkowitz ..........
                                                        H04L 5/0048
(Continued)

FOREIGN PATENT DOCUMENTS

WO    WO-2010148319 A1    12/2010
WO    WO-2014172843 A1    10/2014

OTHER PUBLICATIONS

Intel Corporation: "UL Control Channel Mapping in Time", 3GPP Draft; R1-1609534 Control Channel Mapping in Time, 3rd Generation Partnership Project (3GPP), Mobile Competence Centre, 650, Route Des Lucioles, F-06921 Sophia-Antipolis Cedex, France, vol. RAN WG1, No. Lisbon, Portugal; 20161010-20161014 Oct. 9, 2016, XP051149573, Retrieved from the Internet: URL:http://www.3gpp.org/ftp/Meetings_3GPP_SYNC/RAN1 /Docs/ (retrieved on Oct. 9, 2016], 4 pages.
(Continued)

*Primary Examiner* — Hanh N Nguyen
(74) *Attorney, Agent, or Firm* — Holland & Hart LLP

(57) ABSTRACT

Methods, systems, and devices for wireless communications are described for multiplexing of uplink channels in a shared radio frequency spectrum band. Techniques may provide for segmenting uplink resources into multiple different sets of uplink resources, each set of uplink resources having one or more associated uplink control channel resources. A base station or user equipment (UE) may select a set of uplink resources from the multiple sets of uplink resources for uplink transmissions from the UE based on a location of the uplink control channel resources of the set of uplink resources relative to other allocated uplink resources of the UE. Uplink control information (UCI) may be multiplexed with one or more uplink shared channel transmissions of a UE for transmission to a base station in certain circumstances.

48 Claims, 26 Drawing Sheets

(52) U.S. Cl.
CPC .......... *H04L 5/0053* (2013.01); *H04L 5/0094* (2013.01); *H04W 16/14* (2013.01); *H04W 72/0406* (2013.01); *H04W 72/0446* (2013.01)

(58) Field of Classification Search
CPC ... H04L 5/0044; H04L 5/0048; H04L 5/0053; H04L 5/0094; H04L 1/0013; H04L 5/0051; H04W 72/0413; H04W 16/14; H04W 72/0406; H04W 72/0446; H04W 72/1284; H04W 72/14
See application file for complete search history.

(56) References Cited

U.S. PATENT DOCUMENTS

| | | | |
|---|---|---|---|
| 9,775,141 B2* | 9/2017 | Nimbalker | H04W 74/02 |
| 9,980,255 B2* | 5/2018 | Cheng | H04W 72/042 |
| 10,219,257 B2* | 2/2019 | Yang | H04L 1/1854 |
| 10,461,895 B2* | 10/2019 | Rosa | H04L 1/1854 |
| 10,652,911 B2* | 5/2020 | Yang | H04W 72/048 |
| 10,674,478 B2* | 6/2020 | Suzuki | H04L 5/0055 |
| 2017/0289993 A1 | 10/2017 | Yerramalli et al. | |
| 2019/0268924 A1* | 8/2019 | Kim | H04L 5/0078 |
| 2020/0187169 A1* | 6/2020 | Gao | H04L 5/0094 |

OTHER PUBLICATIONS

Partial International Search Report—PCT/US2018/064496—ISA/EPO—dated Feb. 27, 2019.
International Search Report and Written Opinion—PCT/US2018/064496—ISA/EPO—dated May 16, 2019.
European Search Report—EP21153421—Search Authority—The Hague—dated Feb. 12, 2021.

* cited by examiner

PUSCH can be scheduled for
3ms. PUCCH on the last 2ms

710  DL Resources
715  PUCCH Resources
720  UL Set 1 Resources
725  UL Set 2 Resources

700 ents for Patent claims benefit of U.S.

TECHNIQUES FOR MULTIPLEXING OF UPLINK CHANNELS IN A SHARED RADIO FREQUENCY SPECTRUM BAND

CROSS REFERENCES

The present Application for Patent claims benefit of U.S. Provisional Patent Application No. 62/596,757 by YERRAMALLI et al., entitled "TECHNIQUES FOR MULTIPLEXING OF UPLINK CHANNELS IN A SHARED RADIO FREQUENCY SPECTRUM BAND," filed Dec. 8, 2017, assigned to the assignee hereof, and expressly incorporated by reference in its entirety.

BACKGROUND

The following relates generally to wireless communication and to techniques for multiplexing of uplink channels in a shared radio frequency spectrum band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support techniques for multiplexing of uplink channels in a shared radio frequency spectrum band. Generally, the described techniques provide for segmenting uplink resources into multiple different sets of uplink resources, each set of uplink resources having one or more associated uplink control channel resources. A base station or user equipment (UE) may select a set of uplink resources from the multiple sets of uplink resources for uplink transmissions from the UE based on a location of the uplink control channel resources of the set of uplink resources relative to other allocated uplink resources of the UE. Uplink transmissions may be transmitted using the selected set of uplink resources, and uplink control channel transmissions may be transmitted using uplink control channel resources associated with the selected set of uplink resources.

In some cases, uplink control information (UCI) may be multiplexed with one or more uplink shared channel transmissions of a UE for transmission to a base station. In such cases, the UE may determine whether the uplink shared channel resources that are allocation for uplink shared channel transmissions include sufficient resources for transmission of the UCI to the base station. If the uplink shared channel resources do provide sufficient resources for transmission of the UCI to the base station, the UCI may be transmitted using the uplink shared channel resources. If the uplink shared channel transmissions do not provide sufficient resources for transmission of the UCI to the base station, the UCI may be transmitted using one or more configured uplink control channel resources, and associated uplink shared channel transmissions may be dropped.

A method of wireless communication is described. The method may include receiving, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources, selecting the first set of uplink resources or the second set of uplink resources for an uplink control channel transmission to the base station based at least in part on one or more downlink transmissions from the base station, and transmitting the one or more uplink transmissions to the base station using the selected first set of uplink resources or second set of uplink resources.

An apparatus for wireless communication is described. The apparatus may include means for receiving, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources, means for selecting the first set of uplink resources or the second set of uplink resources for an uplink control channel transmission to the base station based at least in part on one or more downlink transmissions from the base station, and means for transmitting the one or more uplink transmissions to the base station using the selected first set of uplink resources or second set of uplink resources.

Another apparatus for wireless communication is described. The apparatus may include a processor, memory in electronic communication with the processor, and instructions stored in the memory. The instructions may be operable to cause the processor to receive, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources, select the first set of uplink resources or the second set of uplink resources for an uplink control channel transmission to the base station based at least in part on one or more downlink transmissions from the base station, and transmit the one or more uplink transmissions to the base station using the selected first set of uplink resources or second set of uplink resources.

A non-transitory computer-readable medium for wireless communication is described. The non-transitory computer-readable medium may include instructions operable to cause a processor to receive, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources, select the first set of uplink resources or the second set of uplink resources for an uplink control channel transmission to the base station based at least in part on one or more downlink transmissions from the base station, and transmit the one or more uplink transmissions to the base station using the selected first set of uplink resources or second set of uplink resources.

Some examples of the method, apparatus, and non-transitory computer-readable medium described above may further include processes, features, means, or instructions for identifying that one or more downlink transmissions from the base station may be transmitted using downlink resources associated with the first set of uplink resources. Some examples of the method, apparatus, and non-transitory computer-readable medium described above may further include processes, features, means, or instructions for selecting the first set of uplink resources for the one or more uplink transmissions based at least in part on the identifying. Some examples of the method, apparatus, and non-transitory computer-readable medium described above may further include processes, features, means, or instructions for receiving signaling in one or more downlink transmissions that indicates which of the first set of uplink resources or the second set of uplink resources may be to be used for the one or more uplink transmissions.

In some examples of the method, apparatus, and non-transitory computer-readable medium described above, each of the first set of uplink resources and the second set of uplink resources have associated uplink control channel resources, and wherein the selection of the first set of uplink resources or the second set of uplink resources may be based at least in part on a location in time of the uplink control channel resources associated with the first set of uplink resources and a location in time of the uplink control channel resources associated with the second set of uplink resources relative to a time boundary of an uplink transmission duration. In some examples of the method, apparatus, and non-transitory computer-readable medium described above, the one or more uplink transmissions may be transmitted within a radio frame having one or more uplink portions and one or more downlink portions, and wherein each uplink portion may be partitioned into the first set of uplink resources and the second set of uplink resources. In some examples of the method, apparatus, and non-transitory computer-readable medium described above, each of the first set of uplink resources and the second set of uplink resources have uplink control channel resources, and wherein the uplink control channel resources may be independently configured for each of the first set of uplink resources and the second set of uplink resources.

Some examples of the method, apparatus, and non-transitory computer-readable medium described above may further include processes, features, means, or instructions for transmitting using the selected first set of uplink resources or second set of uplink resources for each of one or more downlink-uplink parts of a radio frame based at least in part on an uplink grant received from the base station. In some examples of the method, apparatus, and non-transitory computer-readable medium described above, the uplink grant received from the base station dynamically indicates which of the first set of uplink resources or the second set of uplink resources may be to be used for each downlink-uplink part of the radio frame. In some examples of the method, apparatus, and non-transitory computer-readable medium described above, a first downlink-uplink part of the radio frame uses the first set of uplink resources and a second downlink-uplink part of the radio frame uses the second set of uplink resources.

In some examples of the method, apparatus, and non-transitory computer-readable medium described above, the uplink control channel transmission to the base station may include UCI including one or more of acknowledgement feedback that acknowledges receipt of one or more downlink transmissions or channel state information (CSI) that indicates one or more measured parameters of a channel.

In some examples of the method, apparatus, and non-transitory computer-readable medium described above, the one or more uplink transmissions include one or more uplink shared channel transmissions and one or more uplink control channel transmissions that may be transmitted within one or more uplink subframes of a radio frame, and wherein uplink shared channel transmissions within a first subframe may be dropped when the first subframe includes an uplink control channel transmission. In some examples of the method, apparatus, and non-transitory computer-readable medium described above, the one or more uplink transmissions include one or more uplink shared channel transmissions and one or more uplink control channel transmissions that may be transmitted within one or more uplink subframes of a radio frame, and wherein uplink shared channel transmissions within a first subframe may be rate-matched around an uplink control channel transmission resource when the first subframe includes an uplink control channel transmission. In some examples of the method, apparatus, and non-transitory computer-readable medium described above, the uplink shared channel transmissions within the first subframe may be rate-matched around the uplink control channel transmission resource and one or more other uplink control channel transmission resources of one or more other transmitters.

In some examples of the method, apparatus, and non-transitory computer-readable medium described above, the one or more uplink transmissions include a sounding reference signal (SRS) transmission, and wherein the SRS is transmitted in the selected set of uplink resources when a configured SRS location is within the selected set of uplink resources, and wherein a scheduled SRS transmission is dropped when the configured SRS location is in a different set of uplink resources than the selected set of uplink resources, and wherein the SRS transmission is transmitted in any selected set of uplink resources when the SRS location is not configured.

A method of wireless communication is described. The method may include configuring, at a base station, a first set of uplink resources and a second set of uplink resources within a shared radio frequency spectrum band for uplink transmissions of at least one UE, the first set of uplink resources being adjacent in time to the second set of uplink resources and each of the first set of uplink resources and the second set of uplink resources having associated uplink control channel resources, selecting the first set of uplink resources or the second set of uplink resources for one or more uplink transmissions of a first UE based at least in part on a location in time of the control channel resources associated with the first set of uplink resources and a location in time of the control channel resources associated with the second set of uplink resources relative to a time boundary of an uplink transmission duration of the first UE, and transmitting an indication to the first UE that indicates which of the first set of uplink resources or the second set of uplink resources are to be used for the one or more uplink transmissions.

An apparatus for wireless communication is described. The apparatus may include means for configuring, at a base station, a first set of uplink resources and a second set of uplink resources within a shared radio frequency spectrum band for uplink transmissions of at least one UE, the first set of uplink resources being adjacent in time to the second set of uplink resources and each of the first set of uplink resources and the second set of uplink resources having associated uplink control channel resources, means for selecting the first set of uplink resources or the second set of uplink resources for one or more uplink transmissions of a first UE based at least in part on a location in time of the control channel resources associated with the first set of uplink resources and a location in time of the control channel resources associated with the second set of uplink resources relative to a time boundary of an uplink transmission duration of the first UE, and means for transmitting an indication to the first UE that indicates which of the first set of uplink resources or the second set of uplink resources are to be used for the one or more uplink transmissions.

Another apparatus for wireless communication is described. The apparatus may include a processor, memory in electronic communication with the processor, and instructions stored in the memory. The instructions may be operable to cause the processor to configure, at a base station, a first set of uplink resources and a second set of uplink resources within a shared radio frequency spectrum band for uplink transmissions of at least one UE, the first set of uplink resources being adjacent in time to the second set of uplink resources and each of the first set of uplink resources and the second set of uplink resources having associated uplink control channel resources, select the first set of uplink resources or the second set of uplink resources for one or more uplink transmissions of a first UE based at least in part on a location in time of the control channel resources associated with the first set of uplink resources and a location in time of the control channel resources associated with the second set of uplink resources relative to a time boundary of an uplink transmission duration of the first UE, and transmit an indication to the first UE that indicates which of the first set of uplink resources or the second set of uplink resources are to be used for the one or more uplink transmissions.

A non-transitory computer-readable medium for wireless communication is described. The non-transitory computer-readable medium may include instructions operable to cause a processor to configure, at a base station, a first set of uplink resources and a second set of uplink resources within a shared radio frequency spectrum band for uplink transmissions of at least one UE, the first set of uplink resources being adjacent in time to the second set of uplink resources and each of the first set of uplink resources and the second set of uplink resources having associated uplink control channel resources, select the first set of uplink resources or the second set of uplink resources for one or more uplink transmissions of a first UE based at least in part on a location in time of the control channel resources associated with the first set of uplink resources and a location in time of the control channel resources associated with the second set of uplink resources relative to a time boundary of an uplink transmission duration of the first UE, and transmit an indication to the first UE that indicates which of the first set of uplink resources or the second set of uplink resources are to be used for the one or more uplink transmissions.

Some examples of the method, apparatus, and non-transitory computer-readable medium described above may further include processes, features, means, or instructions for transmitting one or more downlink transmissions to the first UE using a first set of downlink resources, and wherein the first set of downlink resources used for the one or more downlink transmissions indicates to the UE that the first set of uplink resources may be to be used for the one or more uplink transmissions.

In some examples of the method, apparatus, and non-transitory computer-readable medium described above, the transmitting the indication to the first UE may include transmitting signaling in one or more downlink transmissions that may indicate which of the first set of uplink resources or the second set of uplink resources is to be used for the one or more uplink transmissions.

Some examples of the method, apparatus, and non-transitory computer-readable medium described above may further include processes, features, means, or instructions for transmitting signaling in one or more downlink transmissions that indicates which of the first set of uplink resources or the second set of uplink resources may be to be used for the one or more uplink transmissions.

In some examples of the method, apparatus, and non-transitory computer-readable medium described above, the one or more uplink transmissions may be transmitted within a radio frame having one or more uplink portions and one or more downlink portions, and wherein each uplink portion may be partitioned into the first set of uplink resources and the second set of uplink resources. In some examples of the method, apparatus, and non-transitory computer-readable medium described above, each of the first set of uplink resources and the second set of uplink resources have uplink control channel resources, and wherein the uplink control channel resources may be independently configured for each of the first set of uplink resources and the second set of uplink resources.

Some examples of the method, apparatus, and non-transitory computer-readable medium described above may further include processes, features, means, or instructions for configuring the first set of uplink resources and the second set of uplink resources for each of one or more downlink-uplink parts of a radio frame.

Some examples of the method, apparatus, and non-transitory computer-readable medium described above may further include processes, features, means, or instructions for transmitting one or more uplink grants to the first UE that dynamically indicate which of the first set of uplink resources or the second set of uplink resources may be to be used for each downlink-uplink part of the radio frame. In some examples of the method, apparatus, and non-transitory computer-readable medium described above, a first downlink-uplink part of the radio frame uses the first set of uplink resources and a second downlink-uplink part of the radio frame uses the second set of uplink resources. Some examples of the method, apparatus, and non-transitory computer-readable medium described above may further include processes, features, means, or instructions for receiving an uplink control channel transmission from the first UE that includes UCI including one or more of acknowledgement feedback that acknowledges receipt of one or more downlink transmissions or CSI that indicates one or more measured parameters of a channel.

In some examples of the method, apparatus, and non-transitory computer-readable medium described above, the one or more uplink transmissions include one or more uplink shared channel transmissions and one or more uplink control channel transmissions that may be transmitted within one or more uplink subframes of a radio frame, and wherein uplink shared channel transmissions within a first subframe may be dropped when the first subframe includes an uplink control channel transmission. In some examples of the method, apparatus, and non-transitory computer-readable medium described above, the one or more uplink transmissions include one or more uplink shared channel transmissions and one or more uplink control channel transmissions that may be transmitted within one or more uplink subframes of a radio frame, and wherein uplink shared channel transmissions within a first subframe may be rate-matched around an uplink control channel transmission resource when the first subframe includes an uplink control channel transmission. In some examples of the method, apparatus, and non-transitory computer-readable medium described above, the uplink shared channel transmissions within the first subframe may be rate-matched around the uplink control channel transmission resource and one or more other uplink control channel transmission resources of one or more other transmitters.

A method of wireless communication is described. The method may include receiving, at a UE from a base station, configuration information that configures uplink shared channel resources and uplink control channel resources for one or more uplink transmissions from the UE to the base station, identifying UCI to be transmitted to the base station, determining that the uplink shared channel resources include sufficient resources for transmission of the UCI to the base station, and transmitting the UCI to the base station using the uplink shared channel resources responsive to the determining.

An apparatus for wireless communication is described. The apparatus may include means for receiving, at a UE from a base station, configuration information that configures uplink shared channel resources and uplink control channel resources for one or more uplink transmissions from the UE to the base station, means for identifying UCI to be transmitted to the base station, means for determining that the uplink shared channel resources include sufficient resources for transmission of the UCI to the base station, and means for transmitting the UCI to the base station using the uplink shared channel resources responsive to the determining.

Another apparatus for wireless communication is described. The apparatus may include a processor, memory in electronic communication with the processor, and instructions stored in the memory. The instructions may be operable to cause the processor to receive, at a UE from a base station, configuration information that configures uplink shared channel resources and uplink control channel resources for one or more uplink transmissions from the UE to the base station, identify UCI to be transmitted to the base station, determine that the uplink shared channel resources include sufficient resources for transmission of the UCI to the base station, and transmit the UCI to the base station using the uplink shared channel resources responsive to the determining.

A non-transitory computer-readable medium for wireless communication is described. The non-transitory computer-readable medium may include instructions operable to cause a processor to receive, at a UE from a base station, configuration information that configures uplink shared channel resources and uplink control channel resources for one or more uplink transmissions from the UE to the base station, identify UCI to be transmitted to the base station, determine that the uplink shared channel resources include sufficient resources for transmission of the UCI to the base station, and transmit the UCI to the base station using the uplink shared channel resources responsive to the determining.

Some examples of the method, apparatus, and non-transitory computer-readable medium described above may further include processes, features, means, or instructions for transmitting the UCI to the base station using the uplink control channel resources responsive to determining that the uplink shared channel resources include insufficient resources for transmission of the UCI to the base station.

Some examples of the method, apparatus, and non-transitory computer-readable medium described above may further include processes, features, means, or instructions for transmitting one or more uplink shared channel transmissions to the base station using the uplink shared channel resources, wherein the one or more uplink shared channel transmissions are multiplexed with the UCI.

Some examples of the method, apparatus, and non-transitory computer-readable medium described above may further include processes, features, means, or instructions for receiving a downlink control information (DCI) transmission from the base station, the DCI transmission including an indication of whether the uplink shared channel resources can be used to transmit the UCI, and wherein the determining may be performed responsive to receiving a DCI indication that the uplink shared channel resources can be used to transmit the UCI. In some examples of the method, apparatus, and non-transitory computer-readable medium described above, the indication may include a one-bit indication that indicates whether one or more of acknowledgement feedback that acknowledges receipt of one or more downlink transmissions, CSI that indicates one or more measured parameters of a channel, scheduling request (SR) information, or any combination thereof, can be transmitted using the uplink shared channel resources. In some examples of the method, apparatus, and non-transitory computer-readable medium described above, the indication may include a two-bit indication, a first bit of the two-bit indication indicating whether acknowledgement feedback that acknowledges receipt of one or more downlink transmissions can be transmitted using the uplink shared channel resources, and a second bit of the two-bit indication indicating whether CSI that indicates one or more measured parameters of a channel can be transmitted using the uplink shared channel resources.

In some examples of the method, apparatus, and non-transitory computer-readable medium described above, the UCI includes acknowledgement feedback that acknowledges receipt of one or more downlink transmissions that may be transmitted in a first valid subframe of a radio frame after one or more downlink transmissions received from the base station, CSI that indicates one or more measured parameters of a channel that may be transmitted in any available subframe of the radio frame when the CSI may be available and the UE may be configured to report CSI in the radio frame, or any combination thereof. In some examples of the method, apparatus, and non-transitory computer-readable medium described above, the uplink shared channel resources do not overlap with the uplink control channel resources, and wherein the configuration information further configures the UCI to be transmitted using the uplink control channel resources independently of other uplink transmissions using the uplink shared channel resources, or the configuration information further configures the UCI to be transmitted using the uplink shared channel resources responsive to the determining.

Some examples of the method, apparatus, and non-transitory computer-readable medium described above may further include processes, features, means, or instructions for identifying a mapping between a first number of subframes of a radio frame that include the uplink control channel resources and a second number of configured uplink shared channel repetitions, and wherein the determining may be based at least in part on the mapping.

Some examples of the method, apparatus, and non-transitory computer-readable medium described above may further include processes, features, means, or instructions for determining to use the uplink shared channel resources for transmission of the UCI when the second number of configured uplink shared channel repetitions may be greater than or equal to the first number of subframes. Some examples of the method, apparatus, and non-transitory computer-readable medium described above may further include processes, features, means, or instructions for determining to use the uplink control channel resources for transmission of the UCI when the second number of configured uplink shared channel repetitions may be less than the first number of subframes.

A method of wireless communication is described. The method may include configuring, at a base station, a UE with uplink shared channel resources and uplink control channel resources for one or more uplink transmissions from the UE to the base station, configuring the UE to determine whether the uplink shared channel resources include sufficient resources for transmission of UCI to be transmitted to the base station, and receiving the UCI from the UE via the uplink shared channel resources when the uplink shared channel resources include sufficient resources for transmission of the UCI.

An apparatus for wireless communication is described. The apparatus may include means for configuring, at a base station, a UE with uplink shared channel resources and uplink control channel resources for one or more uplink transmissions from the UE to the base station, means for configuring the UE to determine whether the uplink shared channel resources include sufficient resources for transmission of UCI to be transmitted to the base station, and means for receiving the UCI from the UE via the uplink shared channel resources when the uplink shared channel resources include sufficient resources for transmission of the UCI.

Another apparatus for wireless communication is described. The apparatus may include a processor, memory in electronic communication with the processor, and instructions stored in the memory. The instructions may be operable to cause the processor to configure, at a base station, a UE with uplink shared channel resources and uplink control channel resources for one or more uplink transmissions from the UE to the base station, configure the UE to determine whether the uplink shared channel resources include sufficient resources for transmission of UCI to be transmitted to the base station, and receive the UCI from the UE via the uplink shared channel resources when the uplink shared channel resources include sufficient resources for transmission of the UCI.

A non-transitory computer-readable medium for wireless communication is described. The non-transitory computer-readable medium may include instructions operable to cause a processor to configure, at a base station, a UE with uplink shared channel resources and uplink control channel resources for one or more uplink transmissions from the UE to the base station, configure the UE to determine whether the uplink shared channel resources include sufficient resources for transmission of UCI to be transmitted to the base station, and receive the UCI from the UE via the uplink shared channel resources when the uplink shared channel resources include sufficient resources for transmission of the UCI.

Some examples of the method, apparatus, and non-transitory computer-readable medium described above may further include processes, features, means, or instructions for receiving the UCI from the UE via the uplink control channel resources when the uplink shared channel resources include insufficient resources for transmission of the UCI.

Some examples of the method, apparatus, and non-transitory computer-readable medium described above may further include processes, features, means, or instructions for receiving one or more uplink shared channel transmissions from the UE using the uplink shared channel resources, wherein the one or more uplink shared channel transmissions are multiplexed with the UCI.

Some examples of the method, apparatus, and non-transitory computer-readable medium described above may further include processes, features, means, or instructions for transmitting a DCI transmission to the UE, the DCI transmission including an indication of whether the uplink shared channel resources can be used to transmit the UCI. In some examples of the method, apparatus, and non-transitory computer-readable medium described above, the indication may include a one-bit indication that indicates whether one or more of acknowledgement feedback that acknowledges receipt of one or more downlink transmissions, CSI that indicates one or more measured parameters of a channel, scheduling request (SR) information, or any combination thereof, can be transmitted using the uplink shared channel resources. In some examples of the method, apparatus, and non-transitory computer-readable medium described above, the indication may include a two-bit indication, a first bit of the two-bit indication indicating whether acknowledgement feedback that acknowledges receipt of one or more downlink transmissions can be transmitted using the uplink shared channel resources, and a second bit of the two-bit indication indicating whether CSI that indicates one or more measured parameters of a channel can be transmitted using the uplink shared channel resources.

In some examples of the method, apparatus, and non-transitory computer-readable medium described above, the UCI includes acknowledgement feedback that acknowledges receipt of one or more downlink transmissions, the acknowledgement feedback transmitted in a first valid subframe of a radio frame after the one or more downlink transmissions, CSI that indicates one or more measured parameters of a channel, the CSI transmitted in any available subframe of the radio frame when the CSI may be available and the UE may be configured to report CSI in the radio frame, or any combination thereof. In some examples of the method, apparatus, and non-transitory computer-readable medium described above, the uplink shared channel resources do not overlap with the uplink control channel resources, and wherein the UE may be further configured to transmit the UCI using the uplink control channel resources independently of other uplink transmissions using the uplink shared channel resources, or to transmit the UCI using the uplink shared channel resources when the uplink shared channel resources include sufficient resources for transmission of the UCI.

Some examples of the method, apparatus, and non-transitory computer-readable medium described above may further include processes, features, means, or instructions for identifying a mapping between a first number of subframes of a radio frame that include the uplink control channel resources and a second number of configured uplink shared channel repetitions, and wherein a determination that the uplink shared channel resources include sufficient resources for transmission of the UCI may be based at least in part on the mapping. Some examples of the method, apparatus, and non-transitory computer-readable medium described above may further include processes, features, means, or instructions for configuring the UE to determine that the uplink shared channel resources may be used for transmission of the UCI when the second number of configured uplink shared channel repetitions may be greater than or equal to the first number of subframes. Some examples of the method, apparatus, and non-transitory computer-readable medium described above may further include processes, features, means, or instructions for configuring the UE to determine that the uplink control channel resources may be used for transmission of the UCI when the second number of configured uplink shared channel repetitions may be less than the first number of subframes.

DETAILED DESCRIPTION

Figure 1:
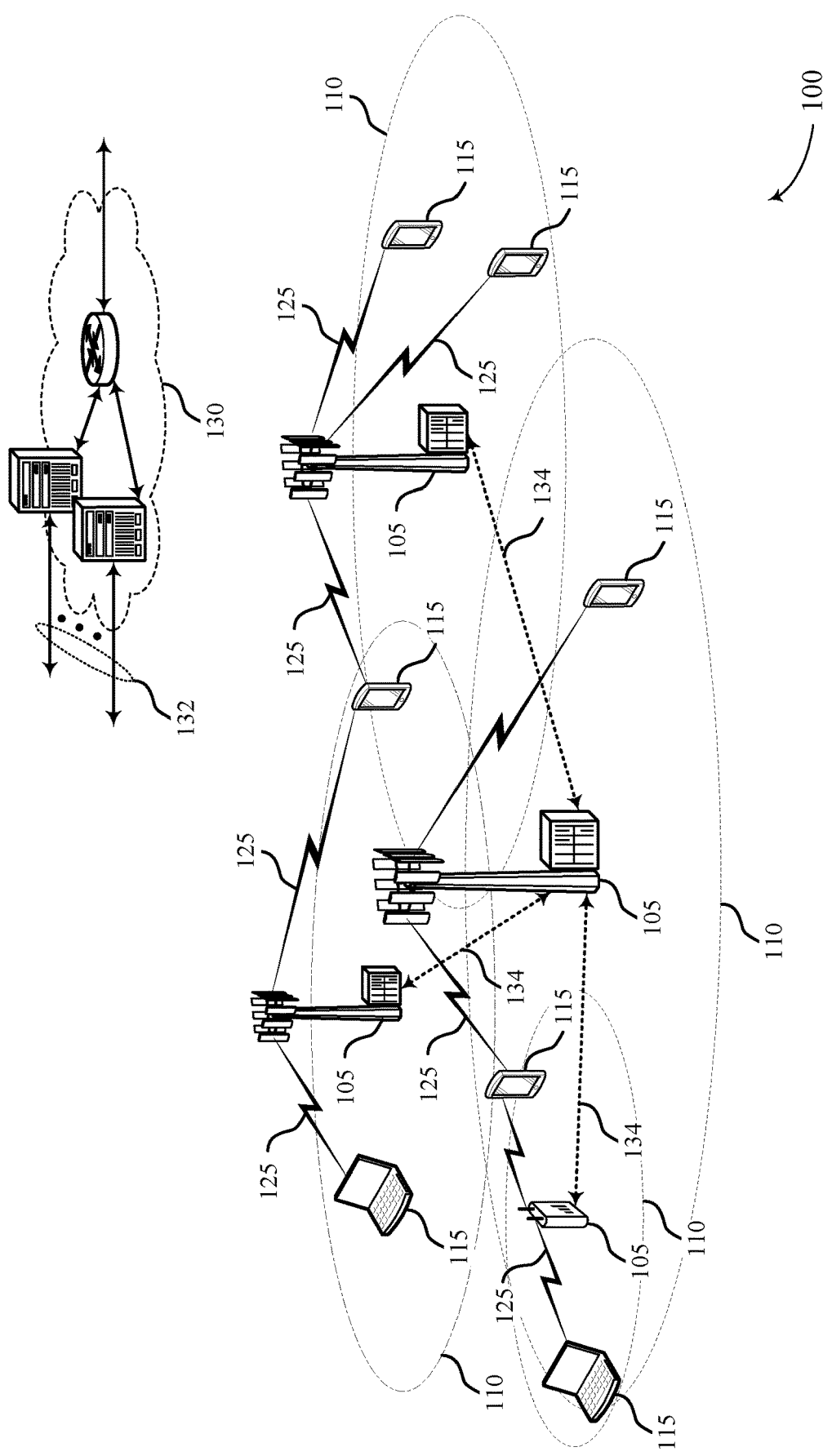
FIG. 1 illustrates an example of a wireless communications system that supports techniques for multiplexing of uplink channels in a shared radio frequency spectrum band in accordance with aspects of the present disclosure.

Various aspects of the present disclosure provide techniques for uplink control channel transmissions in systems that may use shared or unlicensed radio frequency spectrum for wireless transmissions. In some cases, transmissions using shared radio frequency spectrum have one or more constraints that are provided to allow various different transmitters that may want to access the shared radio frequency spectrum to gain control of the medium for transmissions. Such constraints may include a maximum transmission time during a particular time period, such as a maximum transmission time of five milliseconds (with possibly some gaps) followed by no transmissions for the subsequent five milliseconds. In some cases, uplink control channel resources may be preconfigured at certain times, which may be difficult to reconcile with the constraints for transmissions that use the shared radio frequency spectrum. For example, the uplink control channel resources preconfigured at the certain times may not align with the ON/OFF periods associated with the shared radio frequency spectrum, and the UE may have to shift the 5 ms ON/OFF period to accommodate the uplink control channel resources, which may result in the UE dropping one or more subframes of uplink transmissions as a result of shifting the transmission time away from allocated uplink resources.

Various aspects of the present disclosure provide for segmenting uplink resources into multiple different sets of uplink resources, each set of uplink resources having one or more associated uplink control channel resources. A base station or UE may select a set of uplink resources from the multiple sets of uplink resources for uplink transmissions from the UE based on a location of the uplink control channel resources of the set of uplink resources relative to other allocated uplink resources of the UE to provide relatively few dropped uplink transmissions to accommodate the uplink control channel transmissions. Uplink transmissions may be transmitted using the selected set of uplink resources, and uplink control channel transmissions may be transmitted using uplink control channel resources associated with the selected set of uplink resources.

In some cases, uplink control information (UCI) may be multiplexed with one or more uplink shared channel transmissions of a UE for transmission to a base station. In such cases, the UE may determine whether the uplink shared channel resources that are allocated for uplink shared channel transmissions include sufficient resources for transmission of the UCI to the base station. If the uplink shared channel transmissions do provide sufficient resources for transmission of the UCI to the base station, the UCI may be transmitted using the uplink shared channel resources. If the uplink shared channel transmissions do not provide sufficient resources for transmission of the UCI to the base station, the UCI may be transmitted using one or more configured uplink control channel resources, and associated uplink shared channel transmissions may be dropped.

Aspects of the disclosure are initially described in the context of a wireless communications system. Various examples of wireless resources and allocations of uplink control channel and uplink shared channel resources are then described. Aspects of the disclosure are further illustrated by and described with reference to apparatus diagrams, system diagrams, and flowcharts that relate to techniques for multiplexing of uplink channels in a shared radio frequency spectrum band.

FIG. 1 illustrates an example of a wireless communications system 100 that supports techniques for multiplexing of uplink channels in a shared radio frequency spectrum band in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low-latency communications, or communications with low-cost and low-complexity devices. UEs 115 and base stations 105 may, in some cases, use shared radio frequency spectrum for wireless transmissions, and may use resource segmentation techniques as discussed herein to select uplink resources for uplink transmissions based on a location of control channel resources for different sets of uplink resources.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low-cost or low-complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link (such as one of the communication links 125). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

The term "carrier" refers to a set of radio frequency spectrum resources having a defined physical layer structure for supporting communications over a communication link. For example, a carrier of a communication link may include a portion of a radio frequency spectrum band that is operated according to physical layer channels for a given radio access technology. Each physical layer channel may carry user data, control information, or other signaling. A carrier may be associated with a predefined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In some cases, as indicated above, UEs 115 and base stations 105 may use shared radio frequency spectrum for transmissions, and the shared radio frequency spectrum may have one or more transmission timing constraints. Furthermore, in some case, one or more UEs 115 may be MTC devices that may be configured to transmit uplink control channel transmissions according to a predefined configuration. In various examples of the present disclosure uplink resources for uplink transmission from UEs 115 may be segmented into multiple different sets of uplink resources, each set of uplink resources having one or more associated uplink control channel resources. A base station 105 or UE 115 may select a set of uplink resources from the multiple sets of uplink resources for uplink transmissions from the UE 115 based on a location of the uplink control channel resources of the set of uplink resources relative to other allocated uplink resources of the UE 115 to provide relatively few dropped uplink transmissions to accommodate the uplink control channel transmissions. In some cases, UCI may be multiplexed with one or more uplink shared channel transmissions of a UE 115 for transmission to a base station 105.

Figure 2:
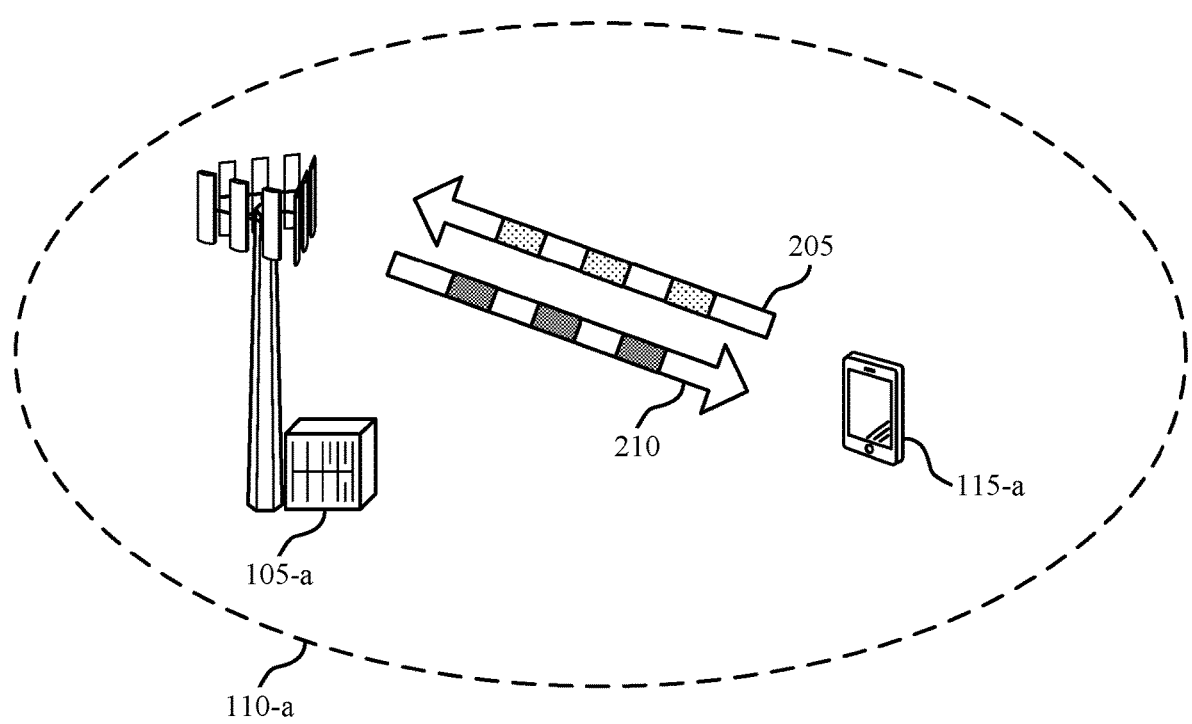
FIG. 2 illustrates an example of a portion of a wireless communications system that supports techniques for multiplexing of uplink channels in a shared radio frequency spectrum band in accordance with aspects of the present disclosure.

FIG. 2 illustrates an example of a portion of a wireless communications system 200 that supports techniques for multiplexing of uplink channels in a shared radio frequency spectrum band in accordance with aspects of the present disclosure. In some examples, wireless communications system 200 may implement aspects of wireless communications system 100. In the example of FIG. 2, the wireless communications system 200 may include a base station 105-a, which may be an example of a base station 105 of FIG. 1. The wireless communications system 200 may also include a UE 115-a, which may be an example of a UE 115, that is located within coverage area 110-a of the base station 105-a, as respectively described with reference to FIG. 1.

In the example of FIG. 2, the base station 105-a and the UE 115-a may establish a connection that may use uplink resources 205 and downlink resources 210. In some cases, the UE 115-a and the base station 105-a may communicate using shared radio frequency spectrum, and one or more uplink transmissions 215, downlink transmissions 220, or combinations thereof, may have one or more constraints for transmissions that use the shared radio frequency spectrum. Such constraints may include, for example, a maximum transmission time during a particular time period, such as a maximum transmission time of five milliseconds (with possibly some gaps) followed by no transmissions from the subsequent five milliseconds, such as illustrated in the gaps between uplink transmissions 215 and downlink transmissions 220 in the illustration of FIG. 2. Such ON/OFF patterns may provide scheduling complexities for a base station that is allocating uplink resources for a UE that may transmit using the shared radio frequency spectrum. In some cases, uplink control channel resources may be preconfigured at certain times, which may be difficult to reconcile with the constraints for transmissions that use the shared radio frequency spectrum. For example, the uplink control channel resources preconfigured at the certain times may not align with the ON/OFF periods associated with the shared radio frequency spectrum, and the UE may have to shift the 5 ms ON/OFF period to accommodate the uplink control channel resources, which may result in the UE dropping one or more subframes of uplink transmissions as a result of shifting the transmission time away from allocated uplink resources.

Various aspects of the present disclosure, as will be discussed in more detail below, provide for segmenting uplink resources into multiple different sets of uplink resources, each set of uplink resources having one or more associated uplink control channel resources. The base station 105-a or UE 115-a may select a set of uplink resources from the multiple sets of uplink resources for uplink transmissions from the UE based on a location of the uplink control channel resources of the set of uplink resources relative to other allocated uplink resources of the UE 115-a to provide relatively few dropped uplink transmissions to accommodate the uplink control channel transmissions. In some cases, UCI may be multiplexed with one or more uplink shared channel transmissions of the UE 115-a for transmission to a base station, as also will be discussed in more detail below. Such uplink control channel and shared channel transmission techniques may allow additional scheduling flexibility for the UE 115-a, which may help to enhance overall network efficiency of the wireless communications system 200. Such techniques may also be beneficial by allowing uplink control channel resources to be allocated for each set of uplink resources in compliance with one or more established communications standards (e.g., a communications standard for enhanced machine type communications using shared radio frequency spectrum).

Figure 3:
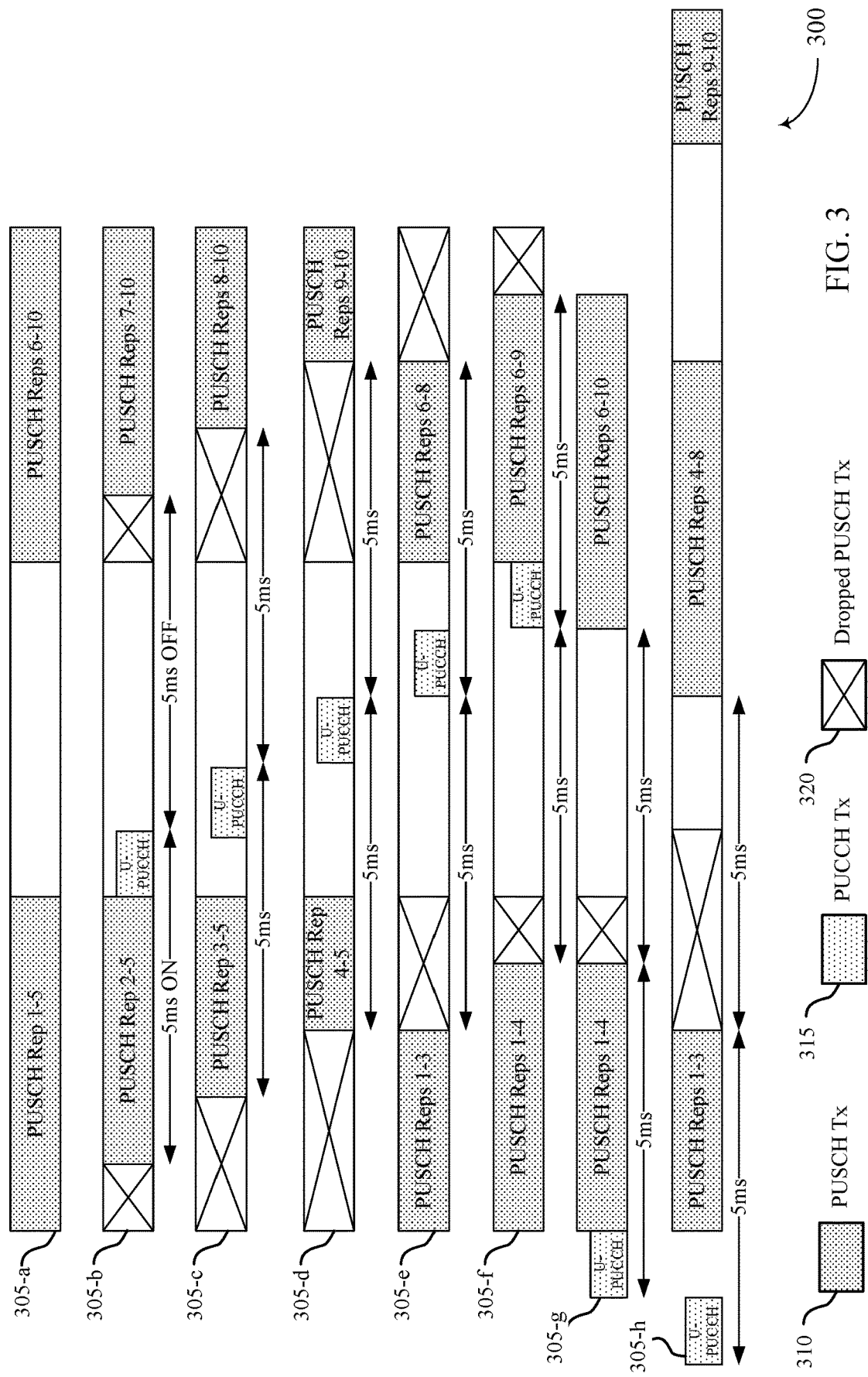
FIG. 3 illustrates an example of wireless resources that support techniques for multiplexing of uplink channels in a shared radio frequency spectrum band in accordance with aspects of the present disclosure.

FIG. 3 illustrates an example of wireless resources 300 that support techniques for multiplexing of uplink channels in a shared radio frequency spectrum band in accordance with aspects of the present disclosure. In some examples, wireless resources 300 may be used to implement aspects of wireless communications system 100 or 200. The wireless resources 300 of FIG. 3 include a number of examples of uplink resources 305 (305-*a*, 305-*b*, 305-*c*, 305-*d*, 305-*e*, 305-*f*, 305-*g*, 305-*h*) that may have different timings for uplink shared channel transmissions 310 (e.g., physical uplink shared channel (PUSCH) transmissions) and uplink control channel transmissions 315 (e.g., physical uplink control channel (PUCCH) transmissions). In some cases, MTC transmissions may employ one or more coverage enhancement (CE) techniques that may provide enhanced reliability of MTC data transmissions, such as providing multiple repetitions of an uplink transmission. In a first example of uplink resources 305-*a*, a UE may transmit five 1 ms uplink subframes during a 5 ms ON duration, in which the five 1 ms subframes may include repetitions 1 through 5 of PUSCH transmissions. In the first example of uplink resources 305-*a*, the first five subframes may be followed by a 5 ms OFF period in accordance with regulatory constraints on transmissions that may use shared radio frequency spectrum, which may be followed by another 5 ms ON period that the UE may be used to transmit repetitions 6 through 10 of the PUSCH transmission in this example.

In the event that the UE is to transmit a control channel transmission to a base station, the control channel resources may, in some cases, be preconfigured and may fall outside of one of the 5 ms ON periods. In a second example of uplink resources 305-*b*, uplink control channel transmissions 315 may be configured for a subframe that is immediately after a subframe that is allocated for uplink shared channel transmissions 310, and in this case the UE may shift the ON period to accommodate the uplink control channel transmissions 315 and drop a first subframe that was allocated for uplink shared channel transmission 310, resulting in dropped uplink shared channel transmissions 320. Various other examples 305 show different amounts of dropped uplink shared channel transmissions 320 based on various different timings of the uplink control channel transmissions 315. In some cases, depending upon the timing of the uplink control channel transmissions 315, a significant number of uplink shared channel transmissions 310 may be dropped.

In such cases, when a UE is to transmit an uplink control channel transmission 315, the UE looks ahead to determine which subframes to drop. The base station in such cases may have increased complexity when scheduling due to trying to predict which subframes the UE would drop. In some cases, a reason for dropping a number of uplink subframes may be because PUCCH resources are present in a different "5 ms period" than the 5 ms ON period that was allocated for the UE. As indicated above, in some cases a base station may configure different sets of uplink resources that each have uplink control channel resources, and a particular set may be selected to reduce an amount of dropped uplink shared channel transmissions, such as described in the examples of FIGS. 4 and 5.

Figure 4:
FIG. 4 illustrates another example of uplink resources that support techniques for multiplexing of uplink channels in a shared radio frequency spectrum band in accordance with aspects of the present disclosure.

FIG. 4 illustrates another example of uplink resources 400 that support techniques for multiplexing of uplink channels in a shared radio frequency spectrum band in accordance with aspects of the present disclosure. In some examples, uplink resources 400 may be used to implement aspects of wireless communications system 100 or 200. In the example of FIG. 4, a number of different uplink transmission resources 405 (405-*a*, 405-*b*, 405-*c*) are illustrated. In this example, first uplink transmission resources 405-*a* may be allocated for a first UE in which resources for uplink shared channel transmissions 410 and for uplink control channel transmissions 415 may be segmented into two sets of resources.

In this example, a first set of uplink control channel resources 420 and a second set of uplink control channel resources 425 may be configured in the different sets of uplink resources, and the first UE may use the first set of uplink resources and transmit control channel transmissions using the first set of uplink control channel resources 420 that immediately follow the first uplink shared channel transmissions 410. In such a manner, a reduced number of uplink shared channel transmissions may be dropped. In the example of FIG. 4, a second UE may have second uplink transmission resources 405-*b* allocated and may use the second set of uplink control channel resources 425. Likewise, a third UE may have third uplink transmission resources 405-*c* allocated and may use the first set of uplink control channel resources 420. In some cases, a base station may configure or signal to the UE the set of control channel resources that are to be used by the UE. In other cases, the UE may identify that downlink transmissions from the base station correspond to a particular set of uplink resources, and may select the uplink resources and uplink control channel resources accordingly.

Figure 5:
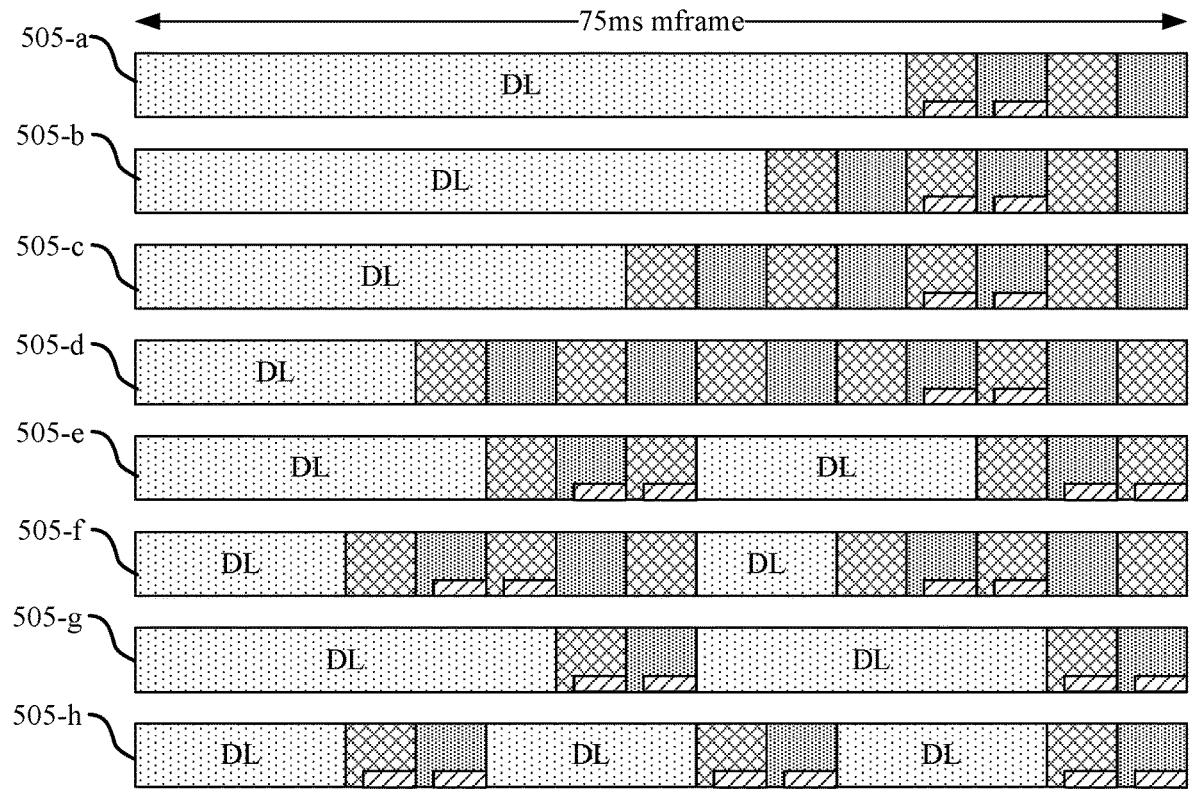
FIG. 5 illustrates an example of frame structures with uplink-downlink parts that support techniques for multiplexing of uplink channels in a shared radio frequency spectrum band in accordance with aspects of the present disclosure.
Figure 5:
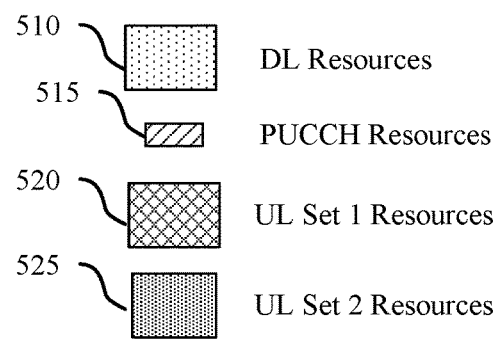

FIG. 5 illustrates an example of frame structures 500 with uplink-downlink parts that support techniques for multiplexing of uplink channels in a shared radio frequency spectrum band in accordance with aspects of the present disclosure. In some examples, frame structures 500 may be used to implement aspects of wireless communications system 100 or 200. In this example, frame structures 500 may have different configurations 505 (505-*a*, 505-*b*, 505-*c*, 505-*d*, 505-*e*, 505-*f*, 505-*g*, 505-*h*) of downlink-uplink parts within a radio frame (which may be referred to as an mframe). In this example, an mframe may be a 75 ms frame that eMTC devices may use for wireless transmissions using shared radio frequency spectrum.

In this example, uplink resources of each downlink-uplink part may be configured to be in two different sets of uplink resources. Thus, in the example of FIG. 5, downlink resources 510 may each have an associated first uplink resource set 520 and second uplink resource set 525, and each uplink resource set 520 and 525 may have associated control channel resources 515. In some examples, for a UE, the base station may use either the first uplink resource set 520 or the second uplink resource set 525, and the UE may use the associated uplink control channel resource 515 in that downlink-uplink part. In some cases, different uplink resource sets can be used in different downlink-uplink parts of an mframe. In some cases, such a division of uplink resource sets allows for enhanced resource utilization as the UE is constrained to transmit only 15 ms in each mframe, which may result in a simpler scheduler implementation with minimal loss in flexibility for a base station and UE.

As indicated, each uplink resource set 520 and 525 may have one or more control channel resources 515. In some cases, a resource configuration of the control channel resources 515 may be independent per each uplink resource set 520 and 525 (e.g., PUCCH formats, resource blocks (RBs), cyclic shifts, locations, periodicity, etc.). Thus, a UE may transmit only in either the first uplink resource set 520 or the second uplink resource set 525 in each downlink-uplink part, depending on the grant from the base station. Thus, the selection of the uplink resource set may be dynamic for each downlink-uplink part, and may be different for different downlink-uplink parts of an mframe. In some cases, the uplink control channel resources 515 associated with an uplink resource set may be used for UCI transmission (e.g., SR information, ACK/NACK information, channel state information (CSI), or any combination thereof). In some cases, uplink shared channel transmissions of the UE may be dropped in the subframes in which the UE has to transmit using uplink control channel resources 515. Additionally or alternatively, uplink shared channel transmissions of the UE may be rate matched around the uplink control channel transmissions in the subframes in which UE has to leave a gap for uplink control channel resources of other UEs. In some examples, a UE may transmit uplink control channel information using one or more uplink shared channel resources, in which cases the UE may drop uplink control channel transmissions, as will be discussed with respect to the examples of FIGS. 6 and 7.

In some cases, a UE may be configured to transmit a sounding reference signal (SRS) transmission in an uplink transmission. In some cases, the base station may configure the UE to transmit the SRS transmission using uplink resources that may be in the first uplink resource set 520. If the UE or base station selects the first uplink resource set 520 for uplink transmissions, the UE may transmit the SRS according to the configured SRS transmission, but if the UE or base station selects the second uplink resource set 525 for uplink transmissions, then the UE may drop the configured SRS transmission. Additionally or alternatively, if an SRS transmission is configured for transmission in an mframe without a configuration for transmission within a particular set of uplink resources, the UE may transmit the SRS transmission in any selected set of uplink resources.

Figure 6:
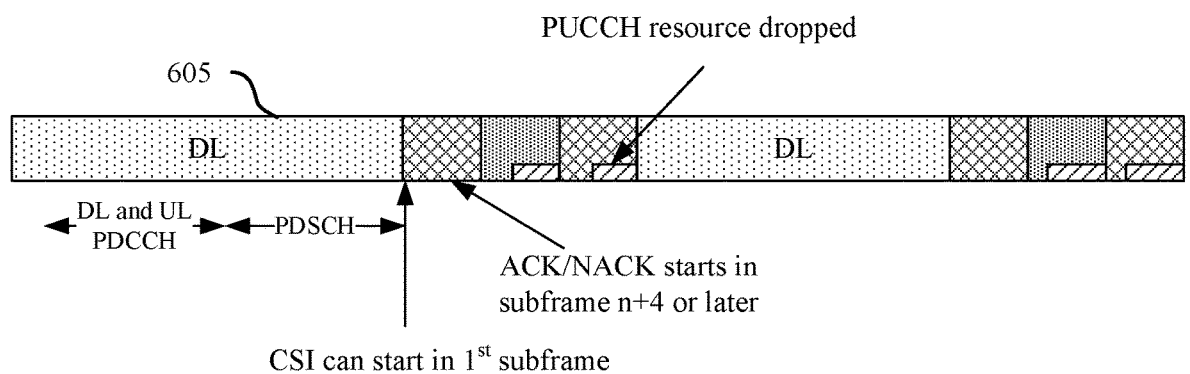
FIGS. 6 and 7 illustrate examples of wireless resources that support techniques for multiplexing of uplink channels in a shared radio frequency spectrum band in accordance with aspects of the present disclosure.
Figure 6:
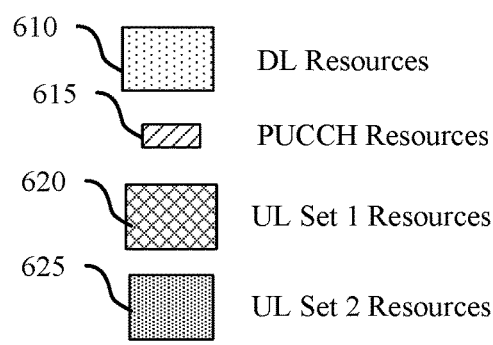

FIG. 6 illustrates an example of wireless resources 600 that support techniques for multiplexing of uplink channels in a shared radio frequency spectrum band in accordance with aspects of the present disclosure. In some examples, wireless resources 600 may be used to implement aspects of wireless communications system 100 or 200. As indicated above, UCI may in some cases be transmitted using uplink shared channel resources. In the example of FIG. 6, uplink resources 605 may include two uplink-downlink parts that each have downlink resources 610, a first set of uplink resources 620, and a second set of uplink resources 625. As discussed above, each set of uplink resources 620 and 625 may have associated uplink control channel resources 615.

In the example of FIG. 6, the first set of uplink resources 620 may be selected for uplink transmissions. In this example, the UE may determine that UCI may be transmitted using uplink shared channel resources, and may drop separate uplink control channel transmissions using the uplink control channel resources 615. In some cases, a timing for when the UE may transmit UCI using uplink shared channel resources may depend upon the time of UCI being transmitted, for example, an ACK/NACK transmission in some cases may only start in the first valid subframe in which ACK/NACK is available, such as a subframe that starts four subframes after a last downlink subframe (i.e., n+4), while uplink shared channel transmissions may start earlier. Further, if the UCI includes CSI of the UE, the UCI transmissions may start along with earlier uplink shared channel transmissions, if CSI is available and the UE is configured to report in that mframe. In some cases, the subframes which carry CSI need not be the same (or even overlapping) with the subframes which carry ACK/NACK. In the event that a downlink grant is missed or if there are multiple uplink shared channel transmissions scheduled, the uplink control channel transmission payload is fixed, so there is no ambiguity. In some cases, CSI transmissions may be rate-matched on uplink shared channel transmissions, while ACK/NACK transmission may puncture the uplink shared channel transmissions.

In some cases, the base station may transmit downlink control information (DCI), and the DCI may be configured to provide an indication that the UE may use to determine whether UCI can be transmitted using uplink shared channel transmissions. In some cases, the DCI may include one or two bits to indicate whether UCI may be transmitted using uplink shared channel transmissions. In cases where the DCI includes one bit, the bit may be set to indicate whether the UE may send ACK/NACK, CSI, SR, or any combination thereof using shared channel transmissions. In cases where the DCI includes two bits ACK/NACK and CSI can be independently triggered by the base station to be transmitted using shared channel transmissions. In some cases, the UE may determine whether to transmit the UCI using shared channel resources or using control channel resources.

Figure 7:
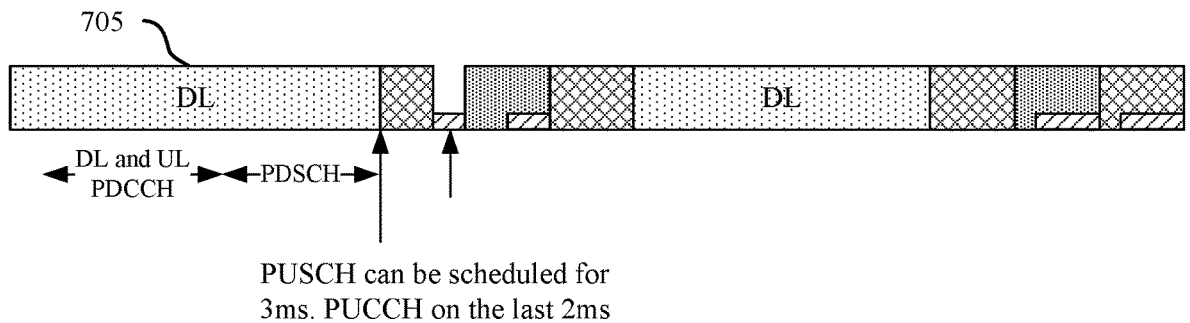
Figure 7:
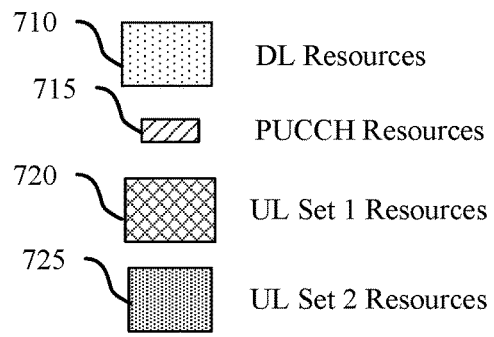

FIG. 7 illustrates an example of wireless resources 700 that support techniques for multiplexing of uplink channels in a shared radio frequency spectrum band in accordance with aspects of the present disclosure. In some examples, wireless resources 700 may be used to implement aspects of wireless communications system 100 or 200. In the example of FIG. 7, uplink resources 705 may include two uplink-downlink parts that each have downlink resources 710, a first set of uplink resources 720, and a second set of uplink resources 725. As discussed above, each set of uplink resources 720 and 725 may have associated uplink control channel resources 715.

In the example of FIG. 7, the UE may transmit UCI using uplink control channel resources 715 in the first set of uplink resources 720. In this case, the UE may drop uplink shared channel transmissions in subframes that are used to transmit uplink control channel transmissions using the uplink control channel resources 715. Thus, uplink control channel transmissions may in some cases be transmitted using uplink shared channel transmissions, as illustrated in FIG. 6, or may be transmitted using uplink control channel transmissions as illustrated in FIG. 7. In some cases, a base station or UE may determine whether the uplink shared channel resources provide sufficient resources for transmission of the UCI from the UE. In some cases, a mapping from UCI payload to a number of PUCCH repetitions and a number of PUSCH repetitions may be provided, that may be used to determine if the uplink shared channel resources include sufficient resources for transmission of the UCI. For example, UCI may include ACK/NACK information that can use a maximum of 48 REs per RB per subframe in the worst case for data and two symbols of demodulation reference signals (in some cases, resources may include 48 REs per RB per subframe for data and 6 symbols of demodulation reference signals). Thus, one subframe of PUCCH may map to multiple subframes of PUSCH (assuming 1RB PUSCH). As such, in some cases, the mapping between the number of uplink control channel subframes and the number of uplink shared channel repetitions may be used to determine whether UCI can be transmitted using shared channel resources. In some cases, if the number of shared channel repetitions is higher than a number of subframes for transmitting UCI, then UE can multiplex UCI on the shared channel transmissions such as illustrated in FIG. 6. If the number of shared channel repetitions are not sufficient, then the UE drops shared channel transmissions in subframes with control channel resources and transmits the control channel transmissions, as illustrated in FIG. 7.

Figure 8:
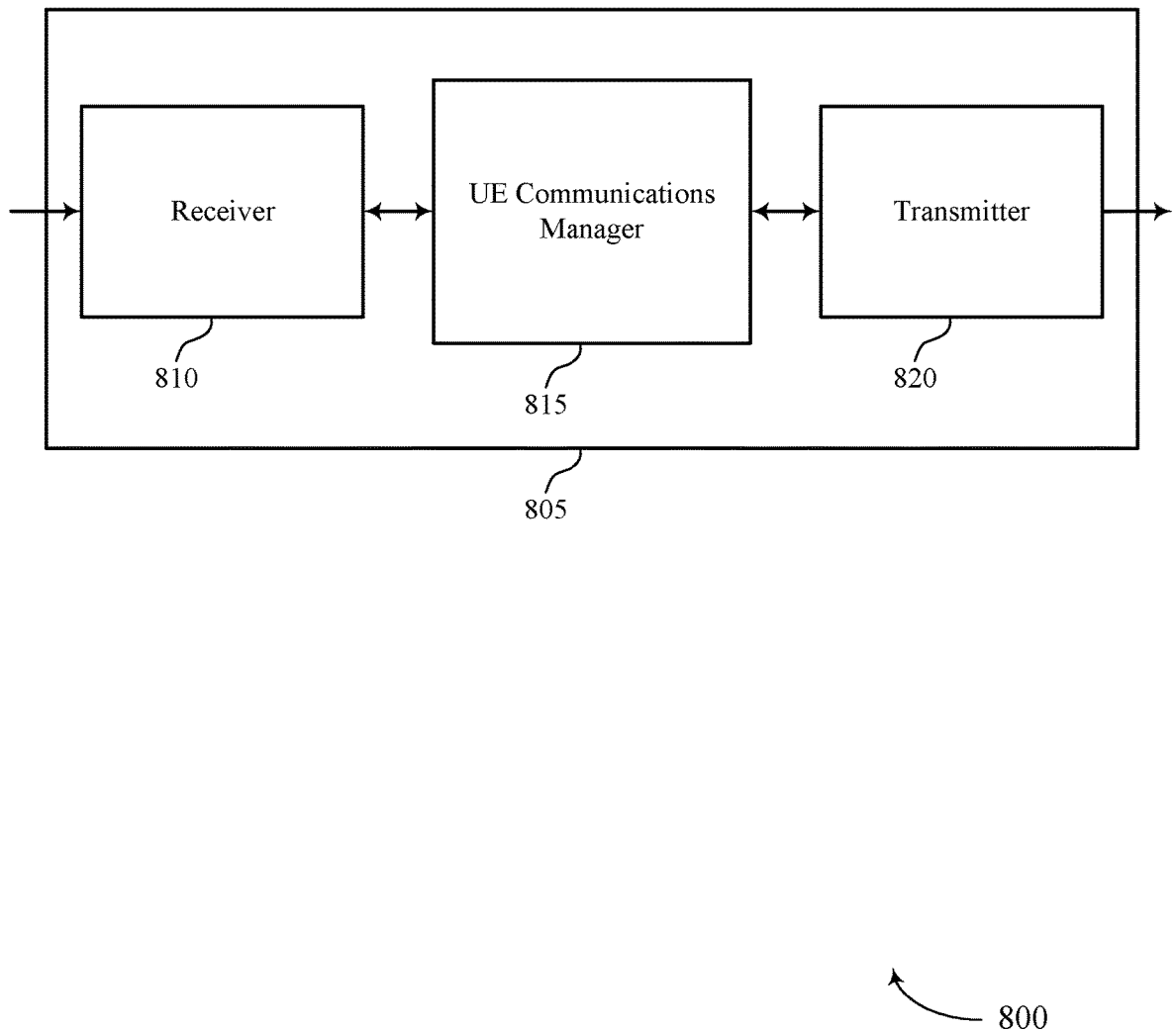
FIGS. 8 and 9 show block diagrams of wireless devices that support techniques for multiplexing of uplink channels in a shared radio frequency spectrum band in accordance with aspects of the present disclosure.

FIG. 8 shows a block diagram 800 of a wireless device 805 that supports techniques for multiplexing of uplink channels in a shared radio frequency spectrum band in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for multiplexing of uplink channels in a shared radio frequency spectrum band, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources, select the first set of uplink resources or the second set of uplink resources for an uplink control channel transmission to the base station based on one or more downlink transmissions from the base station, and transmit the one or more uplink transmissions to the base station using the selected first set of uplink resources or second set of uplink resources.

The UE communications manager 815 may also receive, at a UE from a base station, configuration information that configures uplink shared channel resources and uplink control channel resources for one or more uplink transmissions from the UE to the base station, identify UCI to be transmitted to the base station, determine that the uplink shared channel resources include sufficient resources for transmission of the UCI to the base station, and transmit the UCI to the base station using the uplink shared channel resources responsive to the determining.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
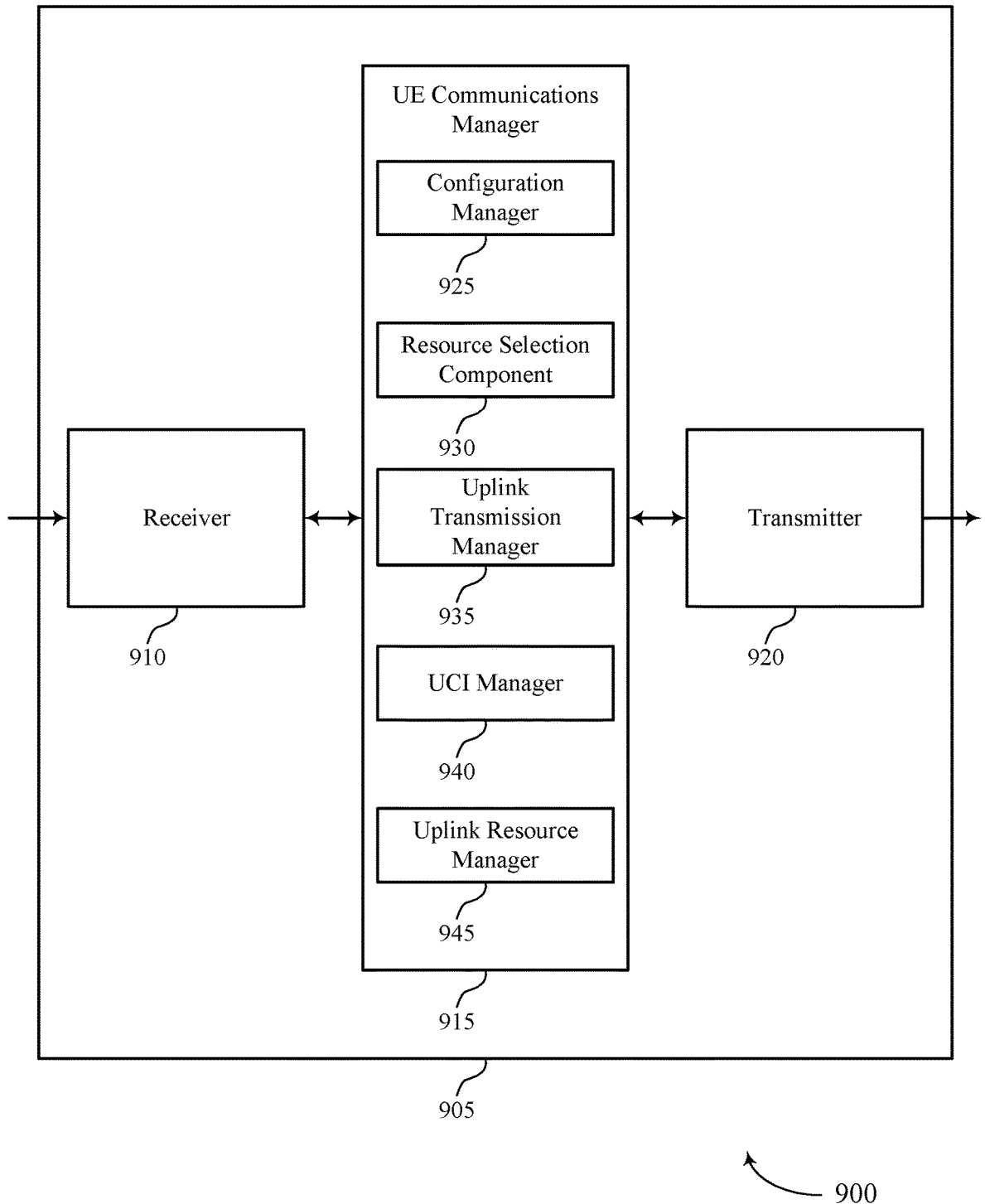

FIG. 9 shows a block diagram 900 of a wireless device 905 that supports techniques for multiplexing of uplink channels in a shared radio frequency spectrum band in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for multiplexing of uplink channels in a shared radio frequency spectrum band, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include configuration manager 925, resource selection component 930, uplink transmission manager 935, UCI manager 940, and uplink resource manager 945.

Configuration manager 925 may receive, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources. In some cases, configuration manager 925 may receive, from a base station, configuration information that configures uplink shared channel resources and uplink control channel resources for one or more uplink transmissions from the UE to the base station.

Resource selection component 930 may select the first set of uplink resources or the second set of uplink resources for an uplink control channel transmission to the base station based on one or more downlink transmissions from the base station, identify that one or more downlink transmissions from the base station are transmitted using downlink resources associated with the first set of uplink resources, and select the first set of uplink resources for the one or more uplink transmissions based on the identifying. In some cases, each of the first set of uplink resources and the second set of uplink resources have associated uplink control channel resources, and the selection of the first set of uplink resources or the second set of uplink resources may be based on a location in time of the uplink control channel resources associated with the first set of uplink resources and a location in time of the uplink control channel resources associated with the second set of uplink resources relative to a time boundary of an uplink transmission duration.

Uplink transmission manager 935 may transmit the one or more uplink transmissions to the base station using the selected first set of uplink resources or second set of uplink resources. In some cases, uplink transmission manager 935 may transmit the UCI to the base station using the uplink shared channel resources responsive to the determining the shared channel resources have sufficient resources for UCI transmission. In some cases, uplink transmission manager 935 may transmit the UCI to the base station using the uplink control channel resources responsive to determining that the uplink shared channel resources include insufficient resources for transmission of the UCI to the base station. In some cases, uplink transmission manager 935 may transmit one or more uplink shared channel transmissions to the base station using the uplink shared channel resources, where the one or more uplink shared channel transmissions may be multiplexed with the UCI.

UCI manager 940 may identify UCI to be transmitted to the base station. In some cases, the uplink control channel transmission to the base station includes UCI including one or more of acknowledgement feedback that acknowledges receipt of one or more downlink transmissions or CSI that indicates one or more measured parameters of a channel. In some cases, the UCI includes acknowledgement feedback that acknowledges receipt of one or more downlink transmissions that is transmitted in a first valid subframe of a radio frame after one or more downlink transmissions received from the base station, CSI that indicates one or more measured parameters of a channel that is transmitted in any available subframe of the radio frame when the CSI is available and the UE is configured to report CSI in the radio frame, or any combination thereof.

Uplink resource manager 945 may determine to use the uplink shared channel resources for transmission of the UCI when the second number of configured uplink shared channel repetitions is greater than or equal to the first number of subframes, or determine to use the uplink control channel resources for transmission of the UCI when the second number of configured uplink shared channel repetitions is less than the first number of subframes. In some cases, uplink resource manager 945 may transmit using the selected first set of uplink resources or second set of uplink resources for each of one or more downlink-uplink parts of a radio frame based on an uplink grant received from the base station. In some cases, uplink resource manager 945 may determine that the uplink shared channel resources include sufficient resources for transmission of the UCI to the base station.

In some cases, the one or more uplink transmissions are transmitted within a radio frame having one or more uplink portions and one or more downlink portions, and where each uplink portion is partitioned into the first set of uplink resources and the second set of uplink resources. In some cases, a first downlink-uplink part of the radio frame uses the first set of uplink resources and a second downlink-uplink part of the radio frame uses the second set of uplink resources. In some cases, the one or more uplink transmissions include one or more uplink shared channel transmissions and one or more uplink control channel transmissions that are transmitted within one or more uplink subframes of a radio frame, and where uplink shared channel transmissions within a first subframe are dropped when the first subframe includes an uplink control channel transmission.

In some cases, the one or more uplink transmissions include one or more uplink shared channel transmissions and one or more uplink control channel transmissions that are transmitted within one or more uplink subframes of a radio frame, and where uplink shared channel transmissions within a first subframe are rate-matched around an uplink control channel transmission resource when the first subframe includes an uplink control channel transmission. In some cases, each of the first set of uplink resources and the second set of uplink resources have uplink control channel resources, and where the uplink control channel resources are independently configured for each of the first set of uplink resources and the second set of uplink resources. In some cases, the uplink shared channel resources do not overlap with the uplink control channel resources, and where the configuration information further configures the UCI to be transmitted using the uplink control channel resources independently of other uplink transmissions using the uplink shared channel resources, or the configuration information further configures the UCI to be transmitted using the uplink shared channel resources responsive to the determining. In some cases, the uplink grant received from the base station dynamically indicates which of the first set of uplink resources or the second set of uplink resources are to be used for each downlink-uplink part of the radio frame. That is, the base station may indicate different selections of the uplink resource set to be used for each downlink-uplink part, and the selection may be different for different downlink-uplink parts of the radio frame (e.g., the selected uplink resource set is dynamic and hence may vary over the frame). In some cases, the uplink shared channel transmissions within the first subframe are rate-matched around the uplink control channel transmission resource and one or more other uplink control channel transmission resources of one or more other transmitters.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
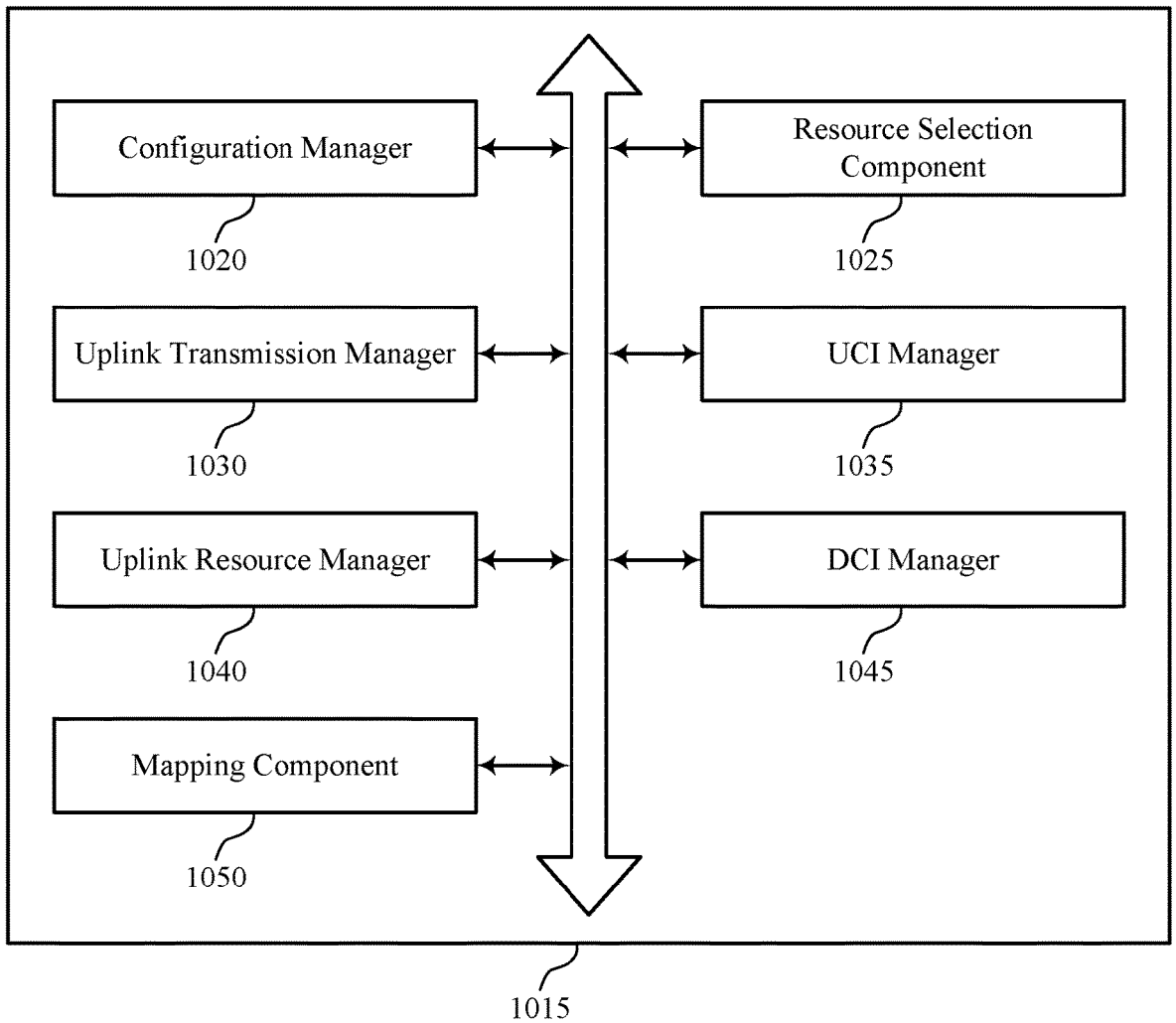
FIG. 10 shows a block diagram of a UE communications manager that supports techniques for multiplexing of uplink channels in a shared radio frequency spectrum band in accordance with aspects of the present disclosure.

FIG. 10 shows a block diagram 1000 of a UE communications manager 1015 that supports techniques for multiplexing of uplink channels in a shared radio frequency spectrum band in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include configuration manager 1020, resource selection component 1025, uplink transmission manager 1030, UCI manager 1035, uplink resource manager 1040, DCI manager 1045, and mapping component 1050. Each of these modules may communicate, directly or indirectly, with one another (e.g., via one or more buses).

Configuration manager 1020 may receive, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources. In some cases, configuration manager 1020 may receive, from a base station, configuration information that configures uplink shared channel resources and uplink control channel resources for one or more uplink transmissions from the UE to the base station.

Resource selection component 1025 may select the first set of uplink resources or the second set of uplink resources for an uplink control channel transmission to the base station based on one or more downlink transmissions from the base station, identify that one or more downlink transmissions from the base station are transmitted using downlink resources associated with the first set of uplink resources, and select the first set of uplink resources for the one or more uplink transmissions based on the identifying. In some cases, each of the first set of uplink resources and the second set of uplink resources have associated uplink control channel resources, and the selection of the first set of uplink resources or the second set of uplink resources may be based on a location in time of the uplink control channel resources associated with the first set of uplink resources and a location in time of the uplink control channel resources associated with the second set of uplink resources relative to a time boundary of an uplink transmission duration.

Uplink transmission manager 1030 may transmit the one or more uplink transmissions to the base station using the selected first set of uplink resources or second set of uplink resources. In some cases, uplink transmission manager 1030 may transmit the UCI to the base station using the uplink shared channel resources responsive to the determining the shared channel resources have sufficient resources for UCI transmission. In some cases, uplink transmission manager 1030 may transmit the UCI to the base station using the uplink control channel resources responsive to determining that the uplink shared channel resources include insufficient resources for transmission of the UCI to the base station. In some cases, uplink transmission manager 1030 may transmit one or more uplink shared channel transmissions to the base station using the uplink shared channel resources, where the one or more uplink shared channel transmissions may be multiplexed with the UCI.

UCI manager 1035 may identify UCI to be transmitted to the base station. In some cases, the uplink control channel transmission to the base station includes UCI including one or more of acknowledgement feedback that acknowledges receipt of one or more downlink transmissions or CSI that indicates one or more measured parameters of a channel. In some cases, the UCI includes acknowledgement feedback that acknowledges receipt of one or more downlink transmissions that is transmitted in a first valid subframe of a radio frame after one or more downlink transmissions received from the base station, CSI that indicates one or more measured parameters of a channel that is transmitted in any available subframe of the radio frame when the CSI is available and the UE is configured to report CSI in the radio frame, or any combination thereof.

Uplink resource manager 1040 may determine to use the uplink shared channel resources for transmission of the UCI when the second number of configured uplink shared channel repetitions is greater than or equal to the first number of subframes, or determine to use the uplink control channel resources for transmission of the UCI when the second number of configured uplink shared channel repetitions is less than the first number of subframes. In some cases, uplink resource manager 1040 may transmit using the selected first set of uplink resources or second set of uplink resources for each of one or more downlink-uplink parts of a radio frame based on an uplink grant received from the base station. In some cases, uplink resource manager 1040 may determine that the uplink shared channel resources include sufficient resources for transmission of the UCI to the base station.

In some cases, the one or more uplink transmissions are transmitted within a radio frame having one or more uplink portions and one or more downlink portions, and where each uplink portion is partitioned into the first set of uplink resources and the second set of uplink resources. In some cases, a first downlink-uplink part of the radio frame uses the first set of uplink resources and a second downlink-uplink part of the radio frame uses the second set of uplink resources. In some cases, the one or more uplink transmissions include one or more uplink shared channel transmissions and one or more uplink control channel transmissions that are transmitted within one or more uplink subframes of a radio frame, and where uplink shared channel transmissions within a first subframe are dropped when the first subframe includes an uplink control channel transmission.

In some cases, the one or more uplink transmissions include one or more uplink shared channel transmissions and one or more uplink control channel transmissions that are transmitted within one or more uplink subframes of a radio frame, and where uplink shared channel transmissions within a first subframe are rate-matched around an uplink control channel transmission resource when the first subframe includes an uplink control channel transmission. In some cases, each of the first set of uplink resources and the second set of uplink resources have uplink control channel resources, and where the uplink control channel resources are independently configured for each of the first set of uplink resources and the second set of uplink resources. In some cases, the uplink shared channel resources do not overlap with the uplink control channel resources, and where the configuration information further configures the UCI to be transmitted using the uplink control channel resources independently of other uplink transmissions using the uplink shared channel resources, or the configuration information further configures the UCI to be transmitted using the uplink shared channel resources responsive to the determining. In some cases, the uplink grant received from the base station dynamically indicates which of the first set of uplink resources or the second set of uplink resources are to be used for each downlink-uplink part of the radio frame. That is, the base station may indicate different selections of the uplink resource set to be used for each downlink-uplink part, and the selection may be different for different downlink-uplink parts of the radio frame. In some cases, the uplink shared channel transmissions within the first subframe are rate-matched around the uplink control channel transmission resource and one or more other uplink control channel transmission resources of one or more other transmitters.

DCI manager 1045 may receive signaling in one or more downlink transmissions that indicates which of the first set of uplink resources or the second set of uplink resources is to be used for the one or more uplink transmissions and receive a DCI transmission from the base station. In some cases, the indication includes a one-bit indication that indicates whether one or more of acknowledgement feedback that acknowledges receipt of one or more downlink transmissions, CSI that indicates one or more measured parameters of a channel, scheduling request (SR) information, or any combination thereof, can be transmitted using the uplink shared channel resources. In some cases, the indication includes a two-bit indication, a first bit of the two-bit indication indicating whether acknowledgement feedback that acknowledges receipt of one or more downlink transmissions can be transmitted using the uplink shared channel resources, and a second bit of the two-bit indication indicating whether CSI that indicates one or more measured parameters of a channel can be transmitted using the uplink shared channel resources.

Mapping component 1050 may identify a mapping between a first number of subframes of a radio frame that include the uplink control channel resources and a second number of configured uplink shared channel repetitions, and where the determining whether to use shared channel resource or control channel resources for UCI transmissions is based on the mapping.

Figure 11:
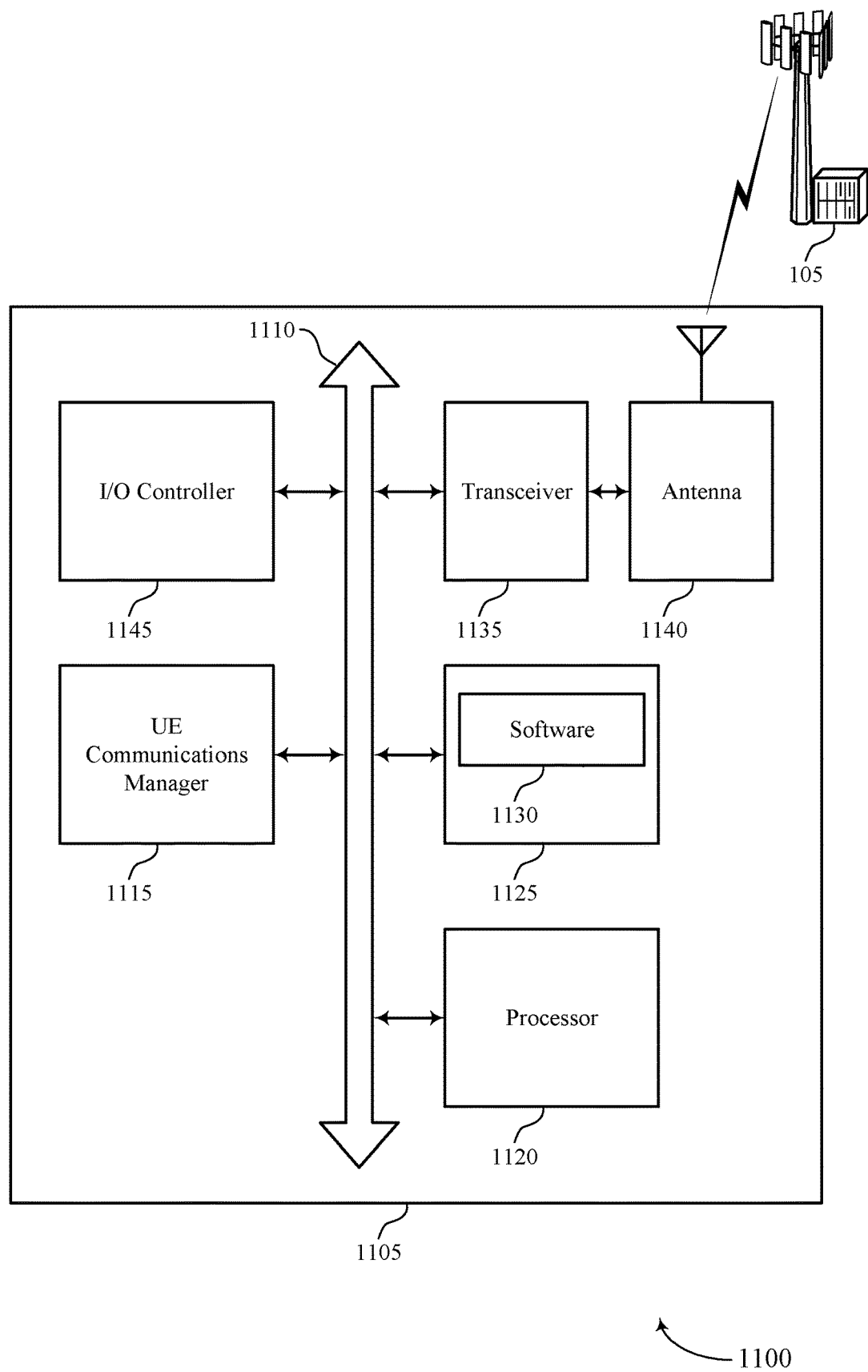
FIG. 11 illustrates a block diagram of a system including a device that supports techniques for multiplexing of uplink channels in a shared radio frequency spectrum band in accordance with aspects of the present disclosure.

FIG. 11 shows a diagram of a system 1100 including a device 1105 that supports techniques for multiplexing of uplink channels in a shared radio frequency spectrum band in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for multiplexing of uplink channels in a shared radio frequency spectrum band).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support techniques for multiplexing of uplink channels in a shared radio frequency spectrum band. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
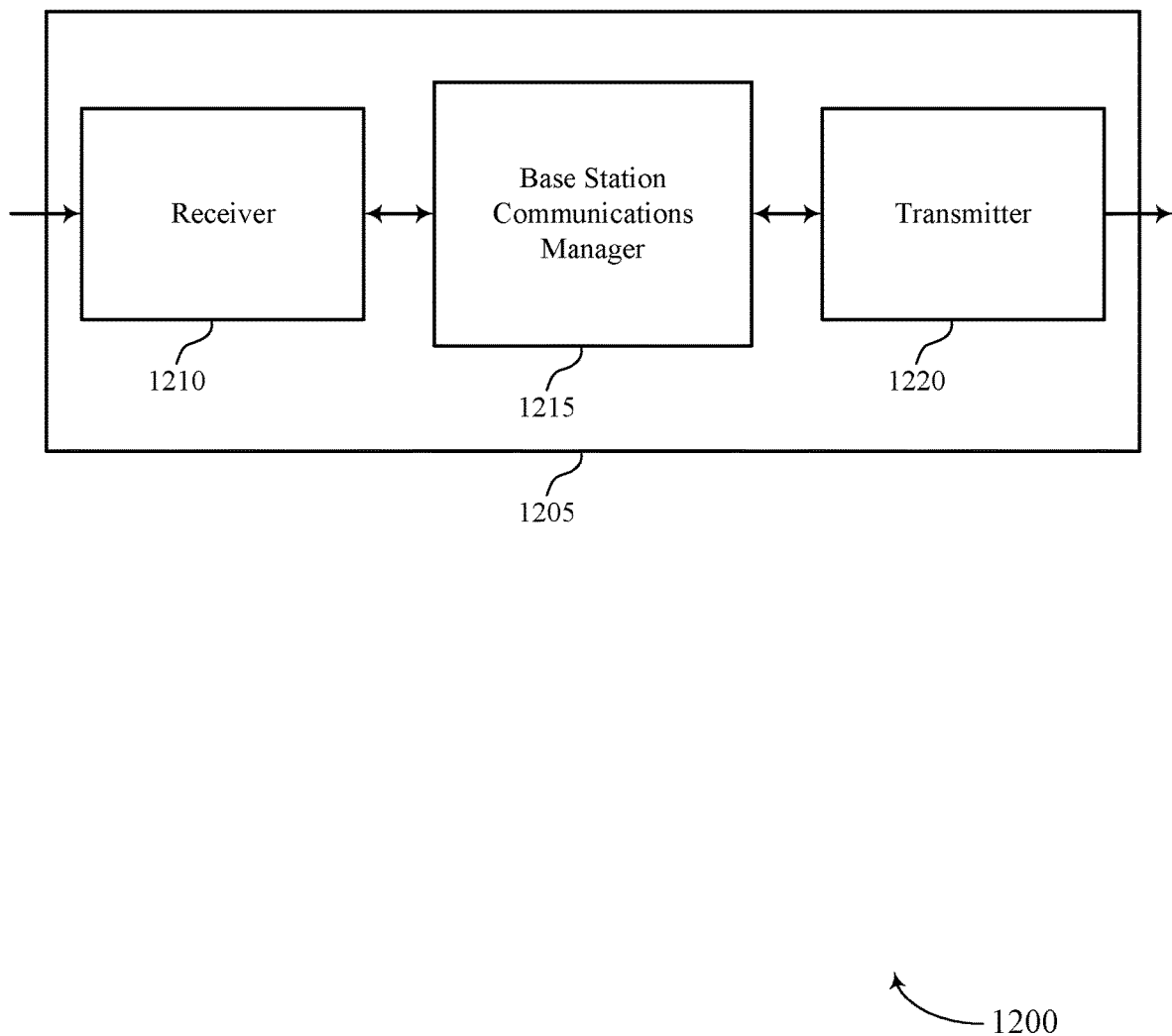
FIGS. 12 and 13 show block diagrams of wireless devices that support techniques for multiplexing of uplink channels in a shared radio frequency spectrum band in accordance with aspects of the present disclosure.

FIG. 12 shows a block diagram 1200 of a wireless device 1205 that supports techniques for multiplexing of uplink channels in a shared radio frequency spectrum band in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to techniques for multiplexing of uplink channels in a shared radio frequency spectrum band, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15.

Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may configure, at a base station, a first set of uplink resources and a second set of uplink resources within a shared radio frequency spectrum band for uplink transmissions of at least one UE, the first set of uplink resources being adjacent in time to the second set of uplink resources and each of the first set of uplink resources and the second set of uplink resources having associated uplink control channel resources, select the first set of uplink resources or the second set of uplink resources for one or more uplink transmissions of a first UE based on a location in time of the control channel resources associated with the first set of uplink resources and a location in time of the control channel resources associated with the second set of uplink resources relative to a time boundary of an uplink transmission duration of the first UE, and transmit an indication to the first UE that indicates which of the first set of uplink resources or the second set of uplink resources are to be used for the one or more uplink transmissions.

The base station communications manager 1215 may also configure, at a base station, a UE with uplink shared channel resources and uplink control channel resources for one or more uplink transmissions from the UE to the base station, configure the UE to determine whether the uplink shared channel resources include sufficient resources for transmission of UCI to be transmitted to the base station, and receive the UCI from the UE via the uplink shared channel resources when the uplink shared channel resources include sufficient resources for transmission of the UCI.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
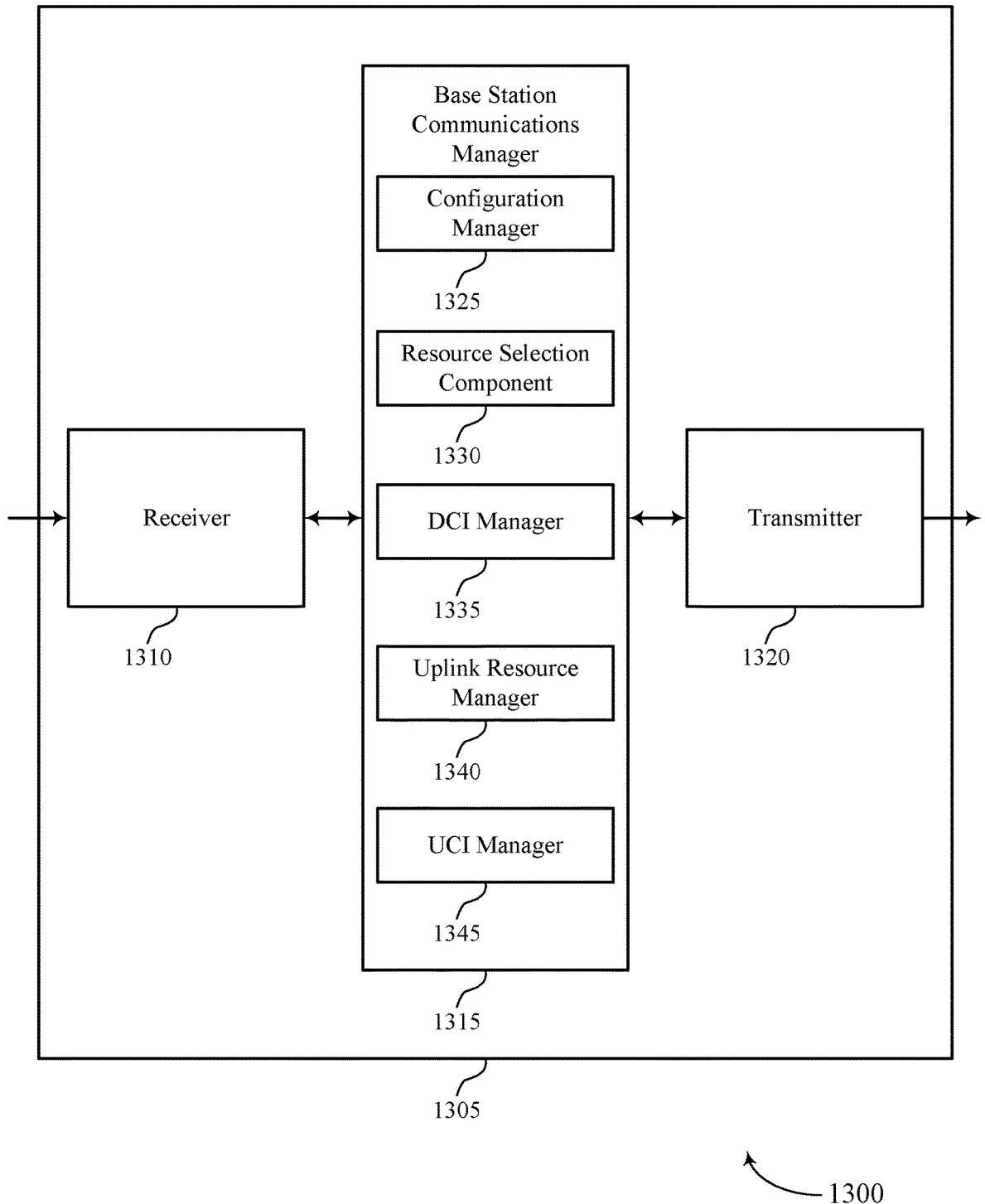

FIG. 13 shows a block diagram 1300 of a wireless device 1305 that supports techniques for multiplexing of uplink channels in a shared radio frequency spectrum band in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques for multiplexing of uplink channels in a shared radio frequency spectrum band, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include configuration manager 1325, resource selection component 1330, DCI manager 1335, uplink resource manager 1340, and UCI manager 1345.

Configuration manager 1325 may configure, at a base station, a first set of uplink resources and a second set of uplink resources within a shared radio frequency spectrum band for uplink transmissions of at least one UE, the first set of uplink resources being adjacent in time to the second set of uplink resources and each of the first set of uplink resources and the second set of uplink resources having associated uplink control channel resources. In some cases, configuration manager 1325 may configure a UE with uplink shared channel resources and uplink control channel resources for one or more uplink transmissions from the UE to the base station.

Resource selection component 1330 may select the first set of uplink resources or the second set of uplink resources for one or more uplink transmissions of a first UE based on a location in time of the control channel resources associated with the first set of uplink resources and a location in time of the control channel resources associated with the second set of uplink resources relative to a time boundary of an uplink transmission duration of the first UE and transmit one or more downlink transmissions to the first UE using a first set of downlink resources. In some cases, the first set of downlink resources used for the one or more downlink transmissions indicates to the UE that the first set of uplink resources are to be used for the one or more uplink transmissions.

DCI manager 1335 may transmit an indication to the first UE that indicates which of the first set of uplink resources or the second set of uplink resources are to be used for the one or more uplink transmissions, transmit signaling in one or more downlink transmissions that indicates which of the first set of uplink resources or the second set of uplink resources is to be used for the one or more uplink transmissions, and transmit a DCI transmission to the UE. In some cases, the indication includes a one-bit indication that indicates whether one or more of acknowledgement feedback that acknowledges receipt of one or more downlink transmissions, CSI that indicates one or more measured parameters of a channel, scheduling request (SR) information, or any combination thereof, can be transmitted using the uplink shared channel resources. In some cases, the indication includes a two-bit indication, a first bit of the two-bit indication indicating whether acknowledgement feedback that acknowledges receipt of one or more downlink transmissions can be transmitted using the uplink shared channel resources, and a second bit of the two-bit indication indicating whether CSI that indicates one or more measured parameters of a channel can be transmitted using the uplink shared channel resources.

Uplink resource manager 1340 may configure the first set of uplink resources and the second set of uplink resources for each of one or more downlink-uplink parts of a radio frame. In some cases, uplink resource manager 1340 may transmit one or more uplink grants to the first UE that dynamically indicate which of the first set of uplink resources or the second set of uplink resources are to be used for each downlink-uplink part of the radio frame. In some cases, uplink resource manager 1340 may configure the UE to determine whether the uplink shared channel resources include sufficient resources for transmission of UCI to be transmitted to the base station.

In some cases, the one or more uplink transmissions are transmitted within a radio frame having one or more uplink portions and one or more downlink portions, and where each uplink portion is partitioned into the first set of uplink resources and the second set of uplink resources. In some cases, a first downlink-uplink part of the radio frame uses the first set of uplink resources and a second downlink-uplink part of the radio frame uses the second set of uplink resources. In some cases, the uplink shared channel resources do not overlap with the uplink control channel resources, and where the UE is further configured to transmit the UCI using the uplink control channel resources independently of other uplink transmissions using the uplink shared channel resources, or to transmit the UCI using the uplink shared channel resources when the uplink shared channel resources include sufficient resources for transmission of the UCI.

In some cases, the one or more uplink transmissions include one or more uplink shared channel transmissions and one or more uplink control channel transmissions that are transmitted within one or more uplink subframes of a radio frame, and where uplink shared channel transmissions within a first subframe are dropped when the first subframe includes an uplink control channel transmission. In some cases, each of the first set of uplink resources and the second set of uplink resources have uplink control channel resources, and where the uplink control channel resources are independently configured for each of the first set of uplink resources and the second set of uplink resources. In some cases, the uplink shared channel transmissions within the first subframe are rate-matched around the uplink control channel transmission resource and one or more other uplink control channel transmission resources of one or more other transmitters. In some cases, the one or more uplink transmissions include one or more uplink shared channel transmissions and one or more uplink control channel transmissions that are transmitted within one or more uplink subframes of a radio frame, and where uplink shared channel transmissions within a first subframe are rate-matched around an uplink control channel transmission resource when the first subframe includes an uplink control channel transmission.

UCI manager 1345 may receive an uplink control channel transmission from the first UE that includes UCI including one or more of acknowledgement feedback that acknowledges receipt of one or more downlink transmissions or CSI that indicates one or more measured parameters of a channel, receive the UCI from the UE via the uplink shared channel resources when the uplink shared channel resources include sufficient resources for transmission of the UCI, and receive the UCI from the UE via the uplink control channel resources when the uplink shared channel resources include insufficient resources for transmission of the UCI. In some cases, UCI manager 1345 may receive one or more uplink shared channel transmissions from the UE using the uplink shared channel resources, where the one or more uplink shared channel transmissions may be multiplexed with the UCI.

In some cases, the UCI includes acknowledgement feedback that acknowledges receipt of one or more downlink transmissions, the acknowledgement feedback transmitted in a first valid subframe of a radio frame after the one or more downlink transmissions, CSI that indicates one or more measured parameters of a channel, the CSI transmitted in any available subframe of the radio frame when the CSI is available and the UE is configured to report CSI in the radio frame, or any combination thereof.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
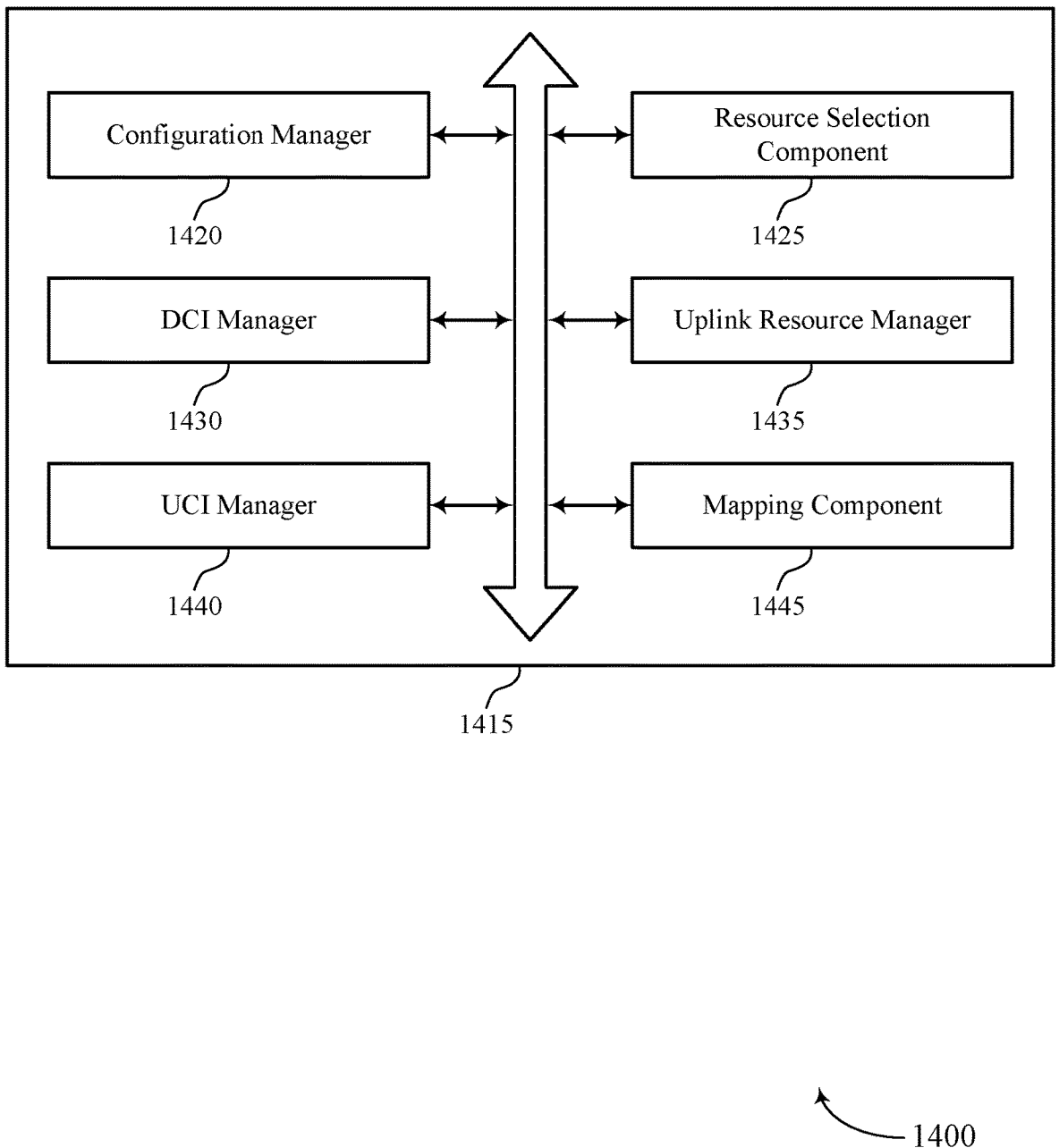
FIG. 14 shows a block diagram of a base station communications manager that supports techniques for multiplexing of uplink channels in a shared radio frequency spectrum band in accordance with aspects of the present disclosure.

FIG. 14 shows a block diagram 1400 of a base station communications manager 1415 that supports techniques for multiplexing of uplink channels in a shared radio frequency spectrum band in accordance with aspects of the present disclosure. The base station communications manager 1415 may be an example of aspects of a base station communications manager 1515 described with reference to FIGS. 12, 13, and 15. The base station communications manager 1415 may include configuration manager 1420, resource selection component 1425, DCI manager 1430, uplink resource manager 1435, UCI manager 1440, and mapping component 1445. Each of these modules may communicate, directly or indirectly, with one another (e.g., via one or more buses).

Configuration manager 1420 may configure, at a base station, a first set of uplink resources and a second set of uplink resources within a shared radio frequency spectrum band for uplink transmissions of at least one UE, the first set of uplink resources being adjacent in time to the second set of uplink resources and each of the first set of uplink resources and the second set of uplink resources having associated uplink control channel resources. In some cases, configuration manager 1420 may configure a UE with uplink shared channel resources and uplink control channel resources for one or more uplink transmissions from the UE to the base station.

Resource selection component 1425 may select the first set of uplink resources or the second set of uplink resources for one or more uplink transmissions of a first UE based on a location in time of the control channel resources associated with the first set of uplink resources and a location in time of the control channel resources associated with the second set of uplink resources relative to a time boundary of an uplink transmission duration of the first UE and transmit one or more downlink transmissions to the first UE using a first set of downlink resources. In some cases, the first set of downlink resources used for the one or more downlink transmissions indicates to the UE that the first set of uplink resources are to be used for the one or more uplink transmissions.

DCI manager 1430 may transmit an indication to the first UE that indicates which of the first set of uplink resources or the second set of uplink resources are to be used for the one or more uplink transmissions, transmit signaling in one or more downlink transmissions that indicates which of the first set of uplink resources or the second set of uplink resources is to be used for the one or more uplink transmissions, and transmit a DCI transmission to the UE. In some cases, the indication includes a one-bit indication that indicates whether one or more of acknowledgement feedback that acknowledges receipt of one or more downlink transmissions, CSI that indicates one or more measured parameters of a channel, scheduling request (SR) information, or any combination thereof, can be transmitted using the uplink shared channel resources. In some cases, the indication includes a two-bit indication, a first bit of the two-bit indication indicating whether acknowledgement feedback that acknowledges receipt of one or more downlink transmissions can be transmitted using the uplink shared channel resources, and a second bit of the two-bit indication indicating whether CSI that indicates one or more measured parameters of a channel can be transmitted using the uplink shared channel resources.

Uplink resource manager 1435 may configure the first set of uplink resources and the second set of uplink resources for each of one or more downlink-uplink parts of a radio frame. In some cases, uplink resource manager 1435 may transmit one or more uplink grants to the first UE that dynamically indicate which of the first set of uplink resources or the second set of uplink resources are to be used for each downlink-uplink part of the radio frame. In some cases, uplink resource manager 1435 may configure the UE to determine whether the uplink shared channel resources include sufficient resources for transmission of UCI to be transmitted to the base station.

In some cases, the one or more uplink transmissions are transmitted within a radio frame having one or more uplink portions and one or more downlink portions, and where each uplink portion is partitioned into the first set of uplink resources and the second set of uplink resources. In some cases, a first downlink-uplink part of the radio frame uses the first set of uplink resources and a second downlink-uplink part of the radio frame uses the second set of uplink resources. In some cases, the uplink shared channel resources do not overlap with the uplink control channel resources, and where the UE is further configured to transmit the UCI using the uplink control channel resources independently of other uplink transmissions using the uplink shared channel resources, or to transmit the UCI using the uplink shared channel resources when the uplink shared channel resources include sufficient resources for transmission of the UCI.

In some cases, the one or more uplink transmissions include one or more uplink shared channel transmissions and one or more uplink control channel transmissions that are transmitted within one or more uplink subframes of a radio frame, and where uplink shared channel transmissions within a first subframe are dropped when the first subframe includes an uplink control channel transmission. In some cases, each of the first set of uplink resources and the second set of uplink resources have uplink control channel resources, and where the uplink control channel resources are independently configured for each of the first set of uplink resources and the second set of uplink resources. In some cases, the uplink shared channel transmissions within the first subframe are rate-matched around the uplink control channel transmission resource and one or more other uplink control channel transmission resources of one or more other transmitters. In some cases, the one or more uplink transmissions include one or more uplink shared channel transmissions and one or more uplink control channel transmissions that are transmitted within one or more uplink subframes of a radio frame, and where uplink shared channel transmissions within a first subframe are rate-matched around an uplink control channel transmission resource when the first subframe includes an uplink control channel transmission.

UCI manager 1440 may receive an uplink control channel transmission from the first UE that includes UCI including one or more of acknowledgement feedback that acknowledges receipt of one or more downlink transmissions or CSI that indicates one or more measured parameters of a channel. In some cases, the UCI may be received from the UE via the uplink shared channel resources when the uplink shared channel resources include sufficient resources for transmission of the UCI. In some cases, the UCI may be received from the UE via the uplink control channel resources when the uplink shared channel resources include insufficient resources for transmission of the UCI. In some cases, the UCI includes acknowledgement feedback that acknowledges receipt of one or more downlink transmissions, the acknowledgement feedback transmitted in a first valid subframe of a radio frame after the one or more downlink transmissions, CSI that indicates one or more measured parameters of a channel, the CSI transmitted in any available subframe of the radio frame when the CSI is available and the UE is configured to report CSI in the radio frame, or any combination thereof.

Mapping component 1445 may identify a mapping between a first number of subframes of a radio frame that include the uplink control channel resources and a second number of configured uplink shared channel repetitions, and where a determination that the uplink shared channel resources include sufficient resources for transmission of the UCI is based on the mapping.

Figure 15:
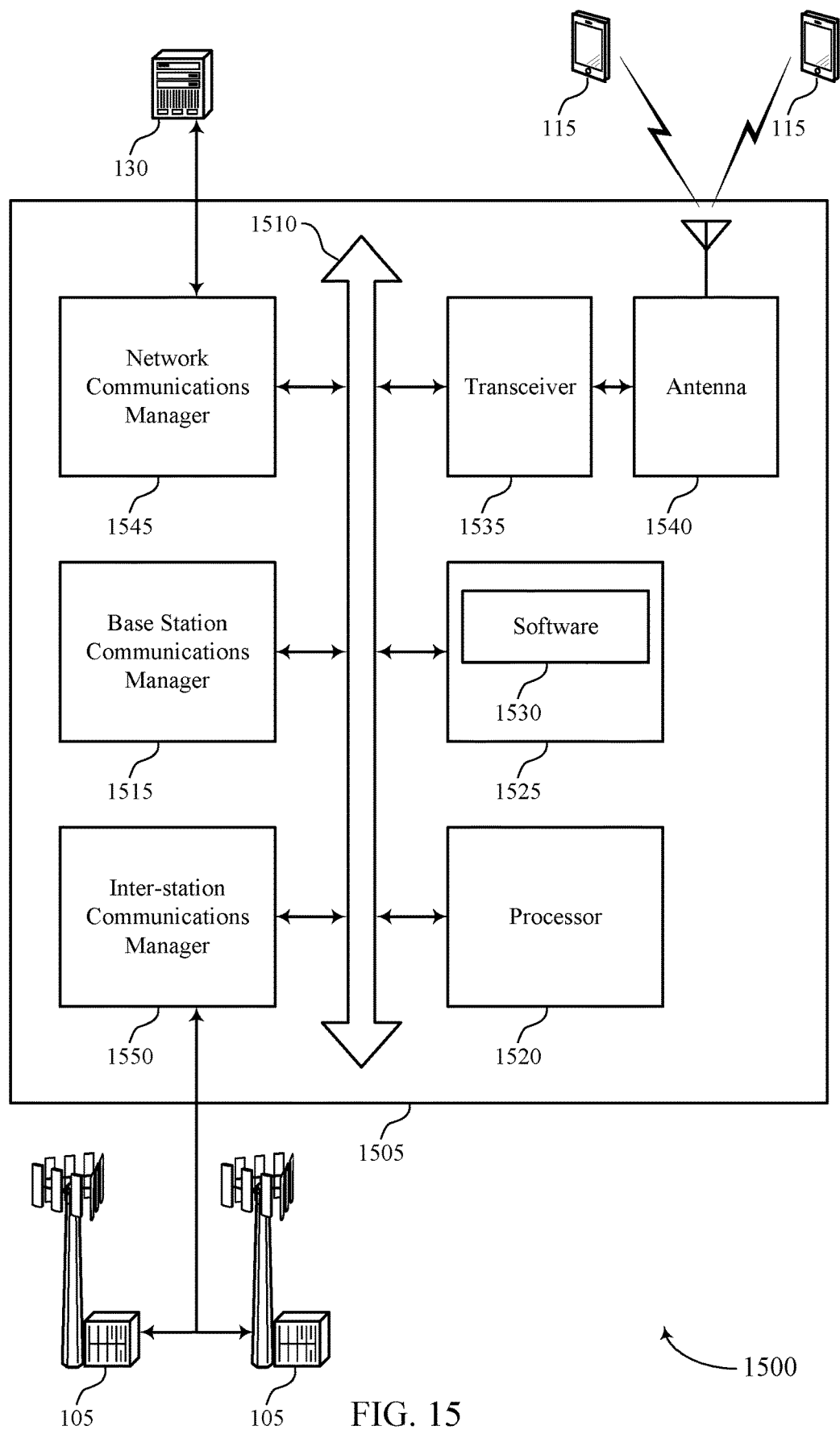
FIG. 15 illustrates a block diagram of a system including a device that supports techniques for multiplexing of uplink channels in a shared radio frequency spectrum band in accordance with aspects of the present disclosure.

FIG. 15 shows a block diagram of a system 1500 including a device 1505 that supports techniques for multiplexing of uplink channels in a shared radio frequency spectrum band in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting techniques for multiplexing of uplink channels in a shared radio frequency spectrum band).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support techniques for multiplexing of uplink channels in a shared radio frequency spectrum band. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
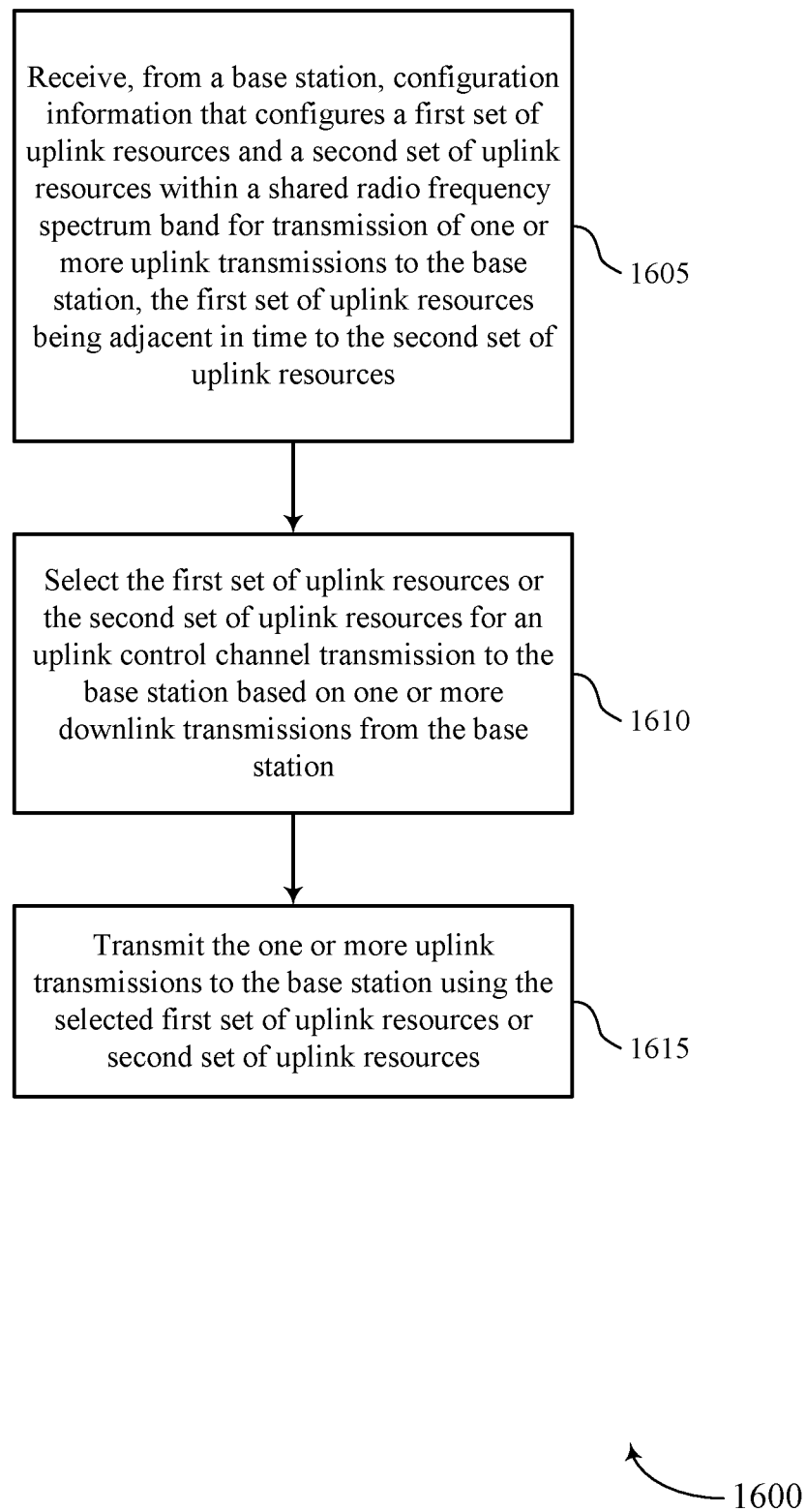
FIGS. 16 through 26 show flowcharts illustrating methods for techniques for multiplexing of uplink channels in a shared radio frequency spectrum band in accordance with aspects of the present disclosure.

FIG. 16 shows a flowchart illustrating a method 1600 for techniques for multiplexing of uplink channels in a shared radio frequency spectrum band in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources. The operations of 1605 may be performed according to the methods described herein. In certain examples, aspects of the operations of 1605 may be performed by a configuration manager as described with reference to FIGS. 8 through 11.

At 1610 the UE 115 may select the first set of uplink resources or the second set of uplink resources for an uplink control channel transmission to the base station based on one or more downlink transmissions from the base station. The operations of 1610 may be performed according to the methods described herein. In certain examples, aspects of the operations of 1610 may be performed by a resource selection component as described with reference to FIGS. 8 through 11.

At 1615 the UE 115 may transmit the one or more uplink transmissions to the base station using the selected first set of uplink resources or second set of uplink resources. The operations of 1615 may be performed according to the methods described herein. In certain examples, aspects of the operations of 1615 may be performed by a uplink transmission manager as described with reference to FIGS. 8 through 11.

Figure 17:
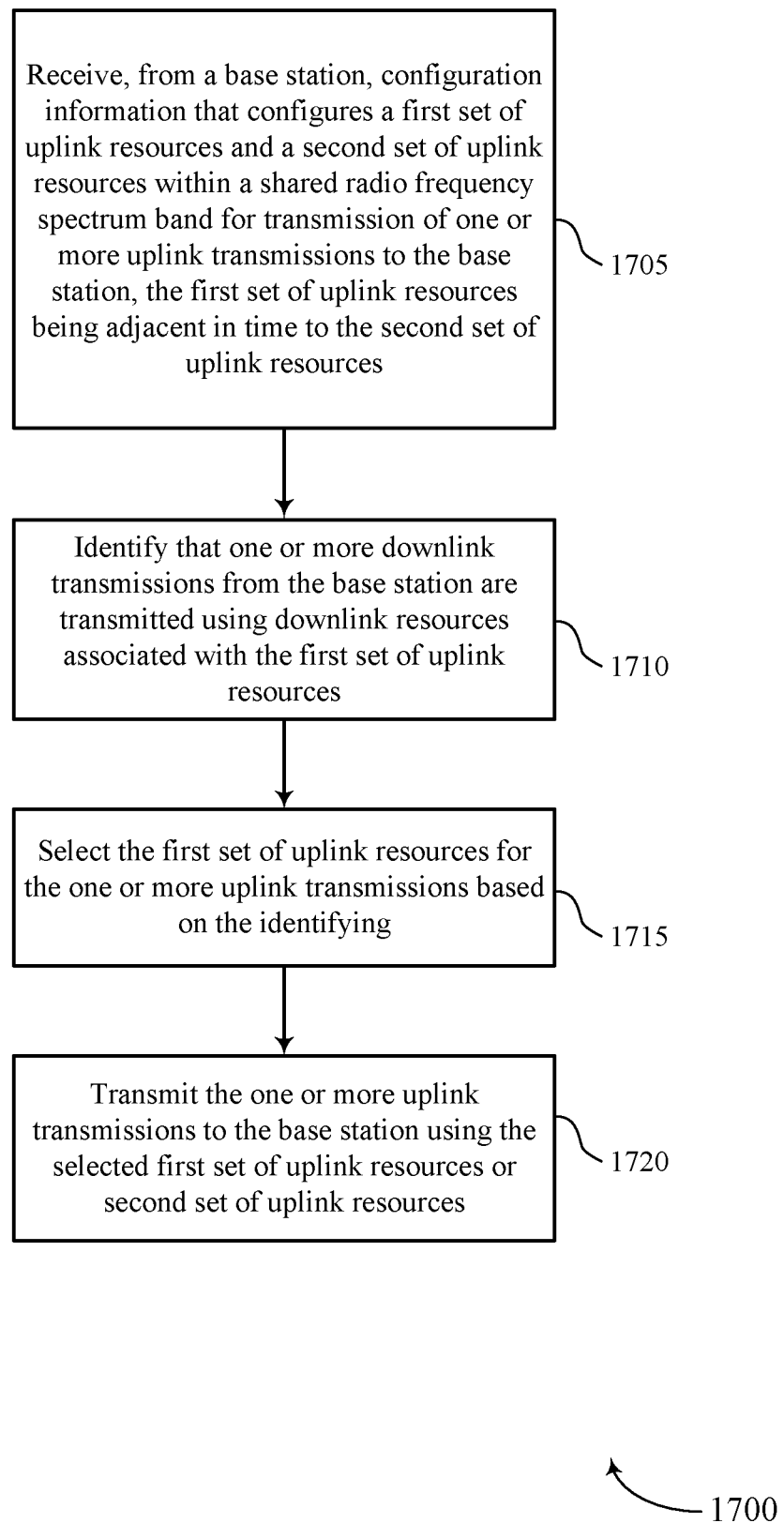

FIG. 17 shows a flowchart illustrating a method 1700 for techniques for multiplexing of uplink channels in a shared radio frequency spectrum band in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources. The operations of 1705 may be performed according to the methods described herein. In certain examples, aspects of the operations of 1705 may be performed by a configuration manager as described with reference to FIGS. 8 through 11.

At 1710 the UE 115 may identify that one or more downlink transmissions from the base station are transmitted using downlink resources associated with the first set of uplink resources. The operations of 1710 may be performed according to the methods described herein. In certain examples, aspects of the operations of 1710 may be performed by a resource selection component as described with reference to FIGS. 8 through 11.

At 1715 the UE 115 may select the first set of uplink resources for the one or more uplink transmissions based on the identifying. The operations of 1715 may be performed according to the methods described herein. In certain examples, aspects of the operations of 1715 may be performed by a resource selection component as described with reference to FIGS. 8 through 11.

At 1720 the UE 115 may transmit the one or more uplink transmissions to the base station using the selected first set of uplink resources or second set of uplink resources. The operations of 1720 may be performed according to the methods described herein. In certain examples, aspects of the operations of 1720 may be performed by a uplink transmission manager as described with reference to FIGS. 8 through 11.

Figure 18:
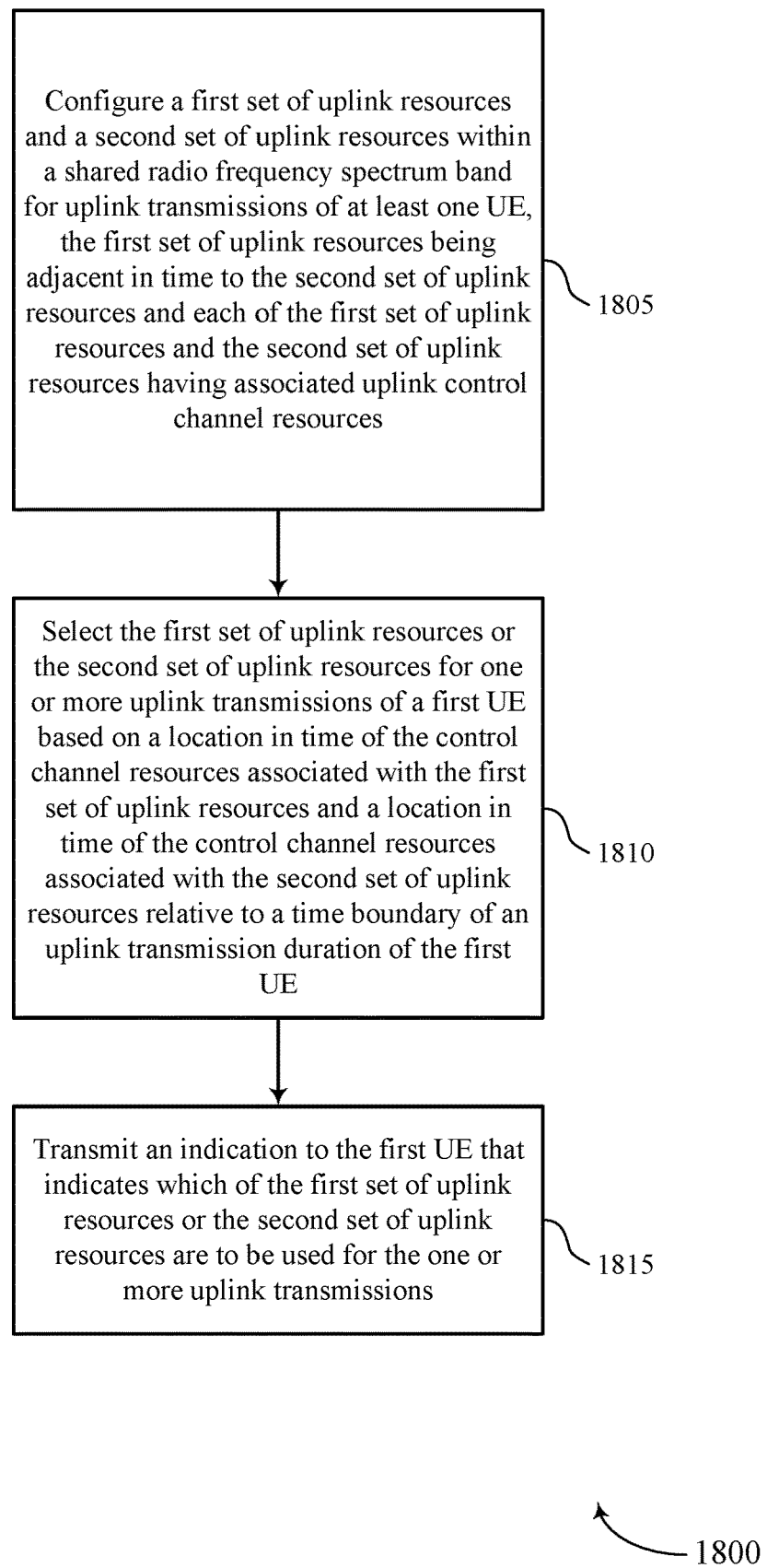

FIG. 18 shows a flowchart illustrating a method 1800 for techniques for multiplexing of uplink channels in a shared radio frequency spectrum band in accordance with aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may configure a first set of uplink resources and a second set of uplink resources within a shared radio frequency spectrum band for uplink transmissions of at least one UE, the first set of uplink resources being adjacent in time to the second set of uplink resources and each of the first set of uplink resources and the second set of uplink resources having associated uplink control channel resources. The operations of 1805 may be performed according to the methods described herein. In certain examples, aspects of the operations of 1805 may be performed by a configuration manager as described with reference to FIGS. 12 through 15.

At 1810 the base station 105 may select the first set of uplink resources or the second set of uplink resources for one or more uplink transmissions of a first UE based on a location in time of the control channel resources associated with the first set of uplink resources and a location in time of the control channel resources associated with the second set of uplink resources relative to a time boundary of an uplink transmission duration of the first UE. The operations of 1810 may be performed according to the methods described herein. In certain examples, aspects of the operations of 1810 may be performed by a resource selection component as described with reference to FIGS. 12 through 15.

At 1815 the base station 105 may transmit an indication to the first UE that indicates which of the first set of uplink resources or the second set of uplink resources are to be used for the one or more uplink transmissions. The operations of 1815 may be performed according to the methods described herein. In certain examples, aspects of the operations of 1815 may be performed by a DCI manager as described with reference to FIGS. 12 through 15.

Figure 19:
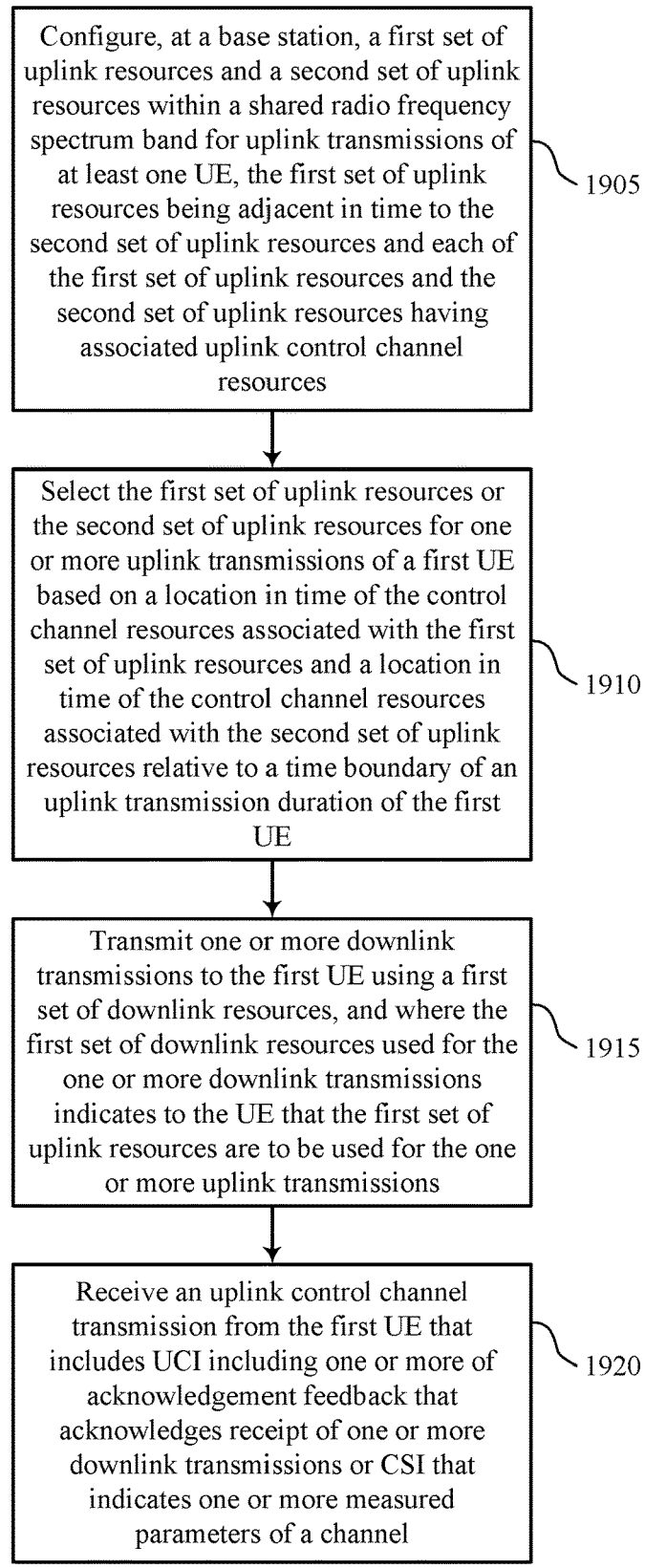

FIG. 19 shows a flowchart illustrating a method 1900 for techniques for multiplexing of uplink channels in a shared radio frequency spectrum band in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may configure, at a base station, a first set of uplink resources and a second set of uplink resources within a shared radio frequency spectrum band for uplink transmissions of at least one UE, the first set of uplink resources being adjacent in time to the second set of uplink resources and each of the first set of uplink resources and the second set of uplink resources having associated uplink control channel resources. The operations of 1905 may be performed according to the methods described herein. In certain examples, aspects of the operations of 1905 may be performed by a configuration manager as described with reference to FIGS. 12 through 15.

At 1910 the base station 105 may select the first set of uplink resources or the second set of uplink resources for one or more uplink transmissions of a first UE based on a location in time of the control channel resources associated with the first set of uplink resources and a location in time of the control channel resources associated with the second set of uplink resources relative to a time boundary of an uplink transmission duration of the first UE. The operations of 1910 may be performed according to the methods described herein. In certain examples, aspects of the operations of 1910 may be performed by a resource selection component as described with reference to FIGS. 12 through 15.

At 1915 the base station 105 may transmit one or more downlink transmissions to the first UE using a first set of downlink resources, and where the first set of downlink resources used for the one or more downlink transmissions indicates to the UE that the first set of uplink resources are to be used for the one or more uplink transmissions. The operations of 1915 may be performed according to the methods described herein. In certain examples, aspects of the operations of 1915 may be performed by a resource selection component as described with reference to FIGS. 12 through 15.

At 1920 the base station 105 may receive an uplink control channel transmission from the first UE that includes UCI including one or more of acknowledgement feedback that acknowledges receipt of one or more downlink transmissions or CSI that indicates one or more measured parameters of a channel. The operations of 1920 may be performed according to the methods described herein. In certain examples, aspects of the operations of 1920 may be performed by a UCI manager as described with reference to FIGS. 12 through 15.

Figure 20:
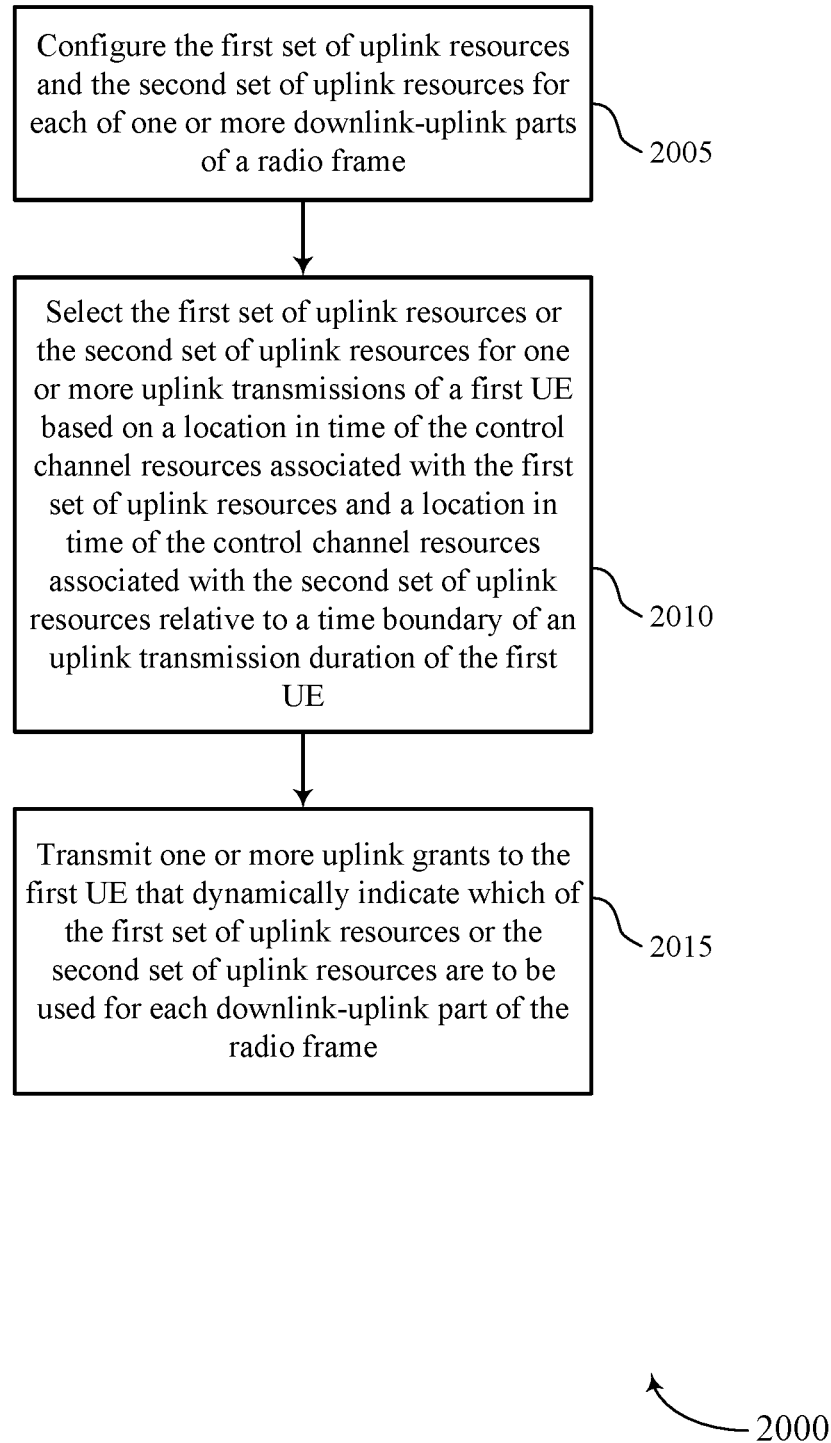

FIG. 20 shows a flowchart illustrating a method 2000 for techniques for multiplexing of uplink channels in a shared radio frequency spectrum band in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may configure the first set of uplink resources and the second set of uplink resources for each of one or more downlink-uplink parts of a radio frame. The operations of 2005 may be performed according to the methods described herein. In certain examples, aspects of the operations of 2005 may be performed by a uplink resource manager as described with reference to FIGS. 12 through 15.

At 2010 the base station 105 may select the first set of uplink resources or the second set of uplink resources for one or more uplink transmissions of a first UE based on a location in time of the control channel resources associated with the first set of uplink resources and a location in time of the control channel resources associated with the second set of uplink resources relative to a time boundary of an uplink transmission duration of the first UE. The operations of 2010 may be performed according to the methods described herein. In certain examples, aspects of the operations of 2010 may be performed by a resource selection component as described with reference to FIGS. 12 through 15.

At 2015 the base station 105 may transmit one or more uplink grants to the first UE that dynamically indicate which of the first set of uplink resources or the second set of uplink resources are to be used for each downlink-uplink part of the radio frame. The operations of 2015 may be performed according to the methods described herein. In certain examples, aspects of the operations of 2015 may be performed by a uplink resource manager as described with reference to FIGS. 12 through 15.

Figure 21:
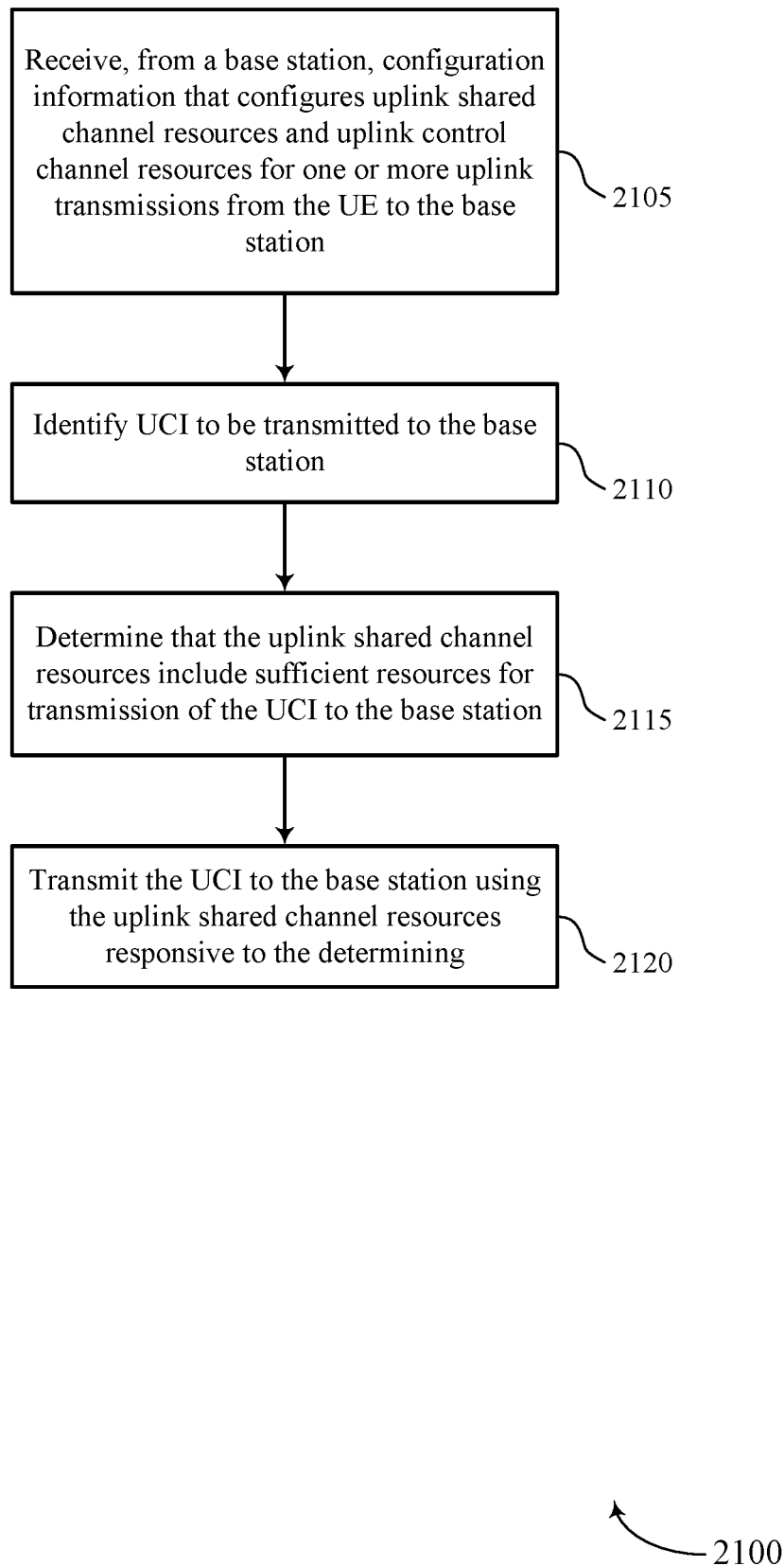

FIG. 21 shows a flowchart illustrating a method 2100 for techniques for multiplexing of uplink channels in a shared radio frequency spectrum band in accordance with aspects of the present disclosure. The operations of method 2100 may be implemented by a UE 115 or its components as described herein. For example, the operations of method 2100 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may receive, from a base station, configuration information that configures uplink shared channel resources and uplink control channel resources for one or more uplink transmissions from the UE to the base station. The operations of 2105 may be performed according to the methods described herein. In certain examples, aspects of the operations of 2105 may be performed by a configuration manager as described with reference to FIGS. 8 through 11.

At 2110 the UE 115 may identify UCI to be transmitted to the base station. The operations of 2110 may be performed according to the methods described herein. In certain examples, aspects of the operations of 2110 may be performed by a UCI manager as described with reference to FIGS. 8 through 11.

At 2115 the UE 115 may determine that the uplink shared channel resources include sufficient resources for transmission of the UCI to the base station. The operations of 2115 may be performed according to the methods described herein. In certain examples, aspects of the operations of 2115 may be performed by a uplink resource manager as described with reference to FIGS. 8 through 11.

At 2120 the UE 115 may transmit the UCI to the base station using the uplink shared channel resources responsive to the determining. The operations of 2120 may be performed according to the methods described herein. In certain examples, aspects of the operations of 2120 may be performed by a uplink transmission manager as described with reference to FIGS. 8 through 11.

Figure 22:
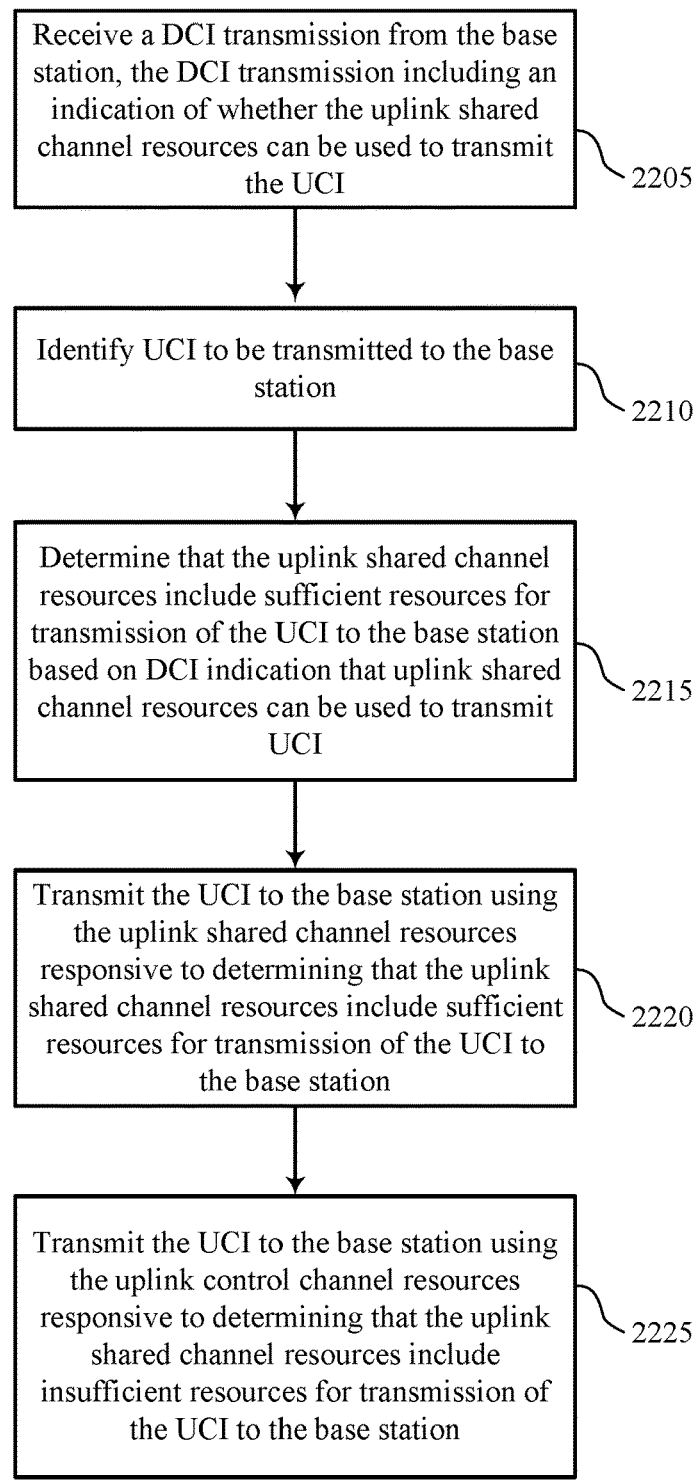

FIG. 22 shows a flowchart illustrating a method 2200 for techniques for multiplexing of uplink channels in a shared radio frequency spectrum band in accordance with aspects of the present disclosure. The operations of method 2200 may be implemented by a UE 115 or its components as described herein. For example, the operations of method 2200 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 2205 the UE 115 may receive a DCI transmission from the base station, the DCI transmission including an indication of whether the uplink shared channel resources can be used to transmit the UCI. The operations of 2205 may be performed according to the methods described herein. In certain examples, aspects of the operations of 2205 may be performed by a DCI manager as described with reference to FIGS. 8 through 11.

At 2210 the UE 115 may identify UCI to be transmitted to the base station. The operations of 2210 may be performed according to the methods described herein. In certain examples, aspects of the operations of 2210 may be performed by a UCI manager as described with reference to FIGS. 8 through 11.

At 2215 the UE 115 may determine that the uplink shared channel resources include sufficient resources for transmission of the UCI to the base station based on DCI indication that uplink shared channel resources can be used to transmit UCI. The operations of 2220 may be performed according to the methods described herein. In certain examples, aspects of the operations of 2220 may be performed by a uplink resource manager as described with reference to FIGS. 8 through 11.

At 2220 the UE 115 may transmit the UCI to the base station using the uplink shared channel resources responsive to determining that the uplink shared channel resources include sufficient resources for transmission of the UCI to the base station. The operations of 2220 may be performed according to the methods described herein. In certain examples, aspects of the operations of 2220 may be performed by a uplink transmission manager as described with reference to FIGS. 8 through 11.

At 2225 the UE 115 may transmit the UCI to the base station using the uplink control channel resources responsive to determining that the uplink shared channel resources include insufficient resources for transmission of the UCI to the base station. The operations of 2225 may be performed according to the methods described herein. In certain examples, aspects of the operations of 2225 may be performed by a uplink transmission manager as described with reference to FIGS. 8 through 11.

Figure 23:
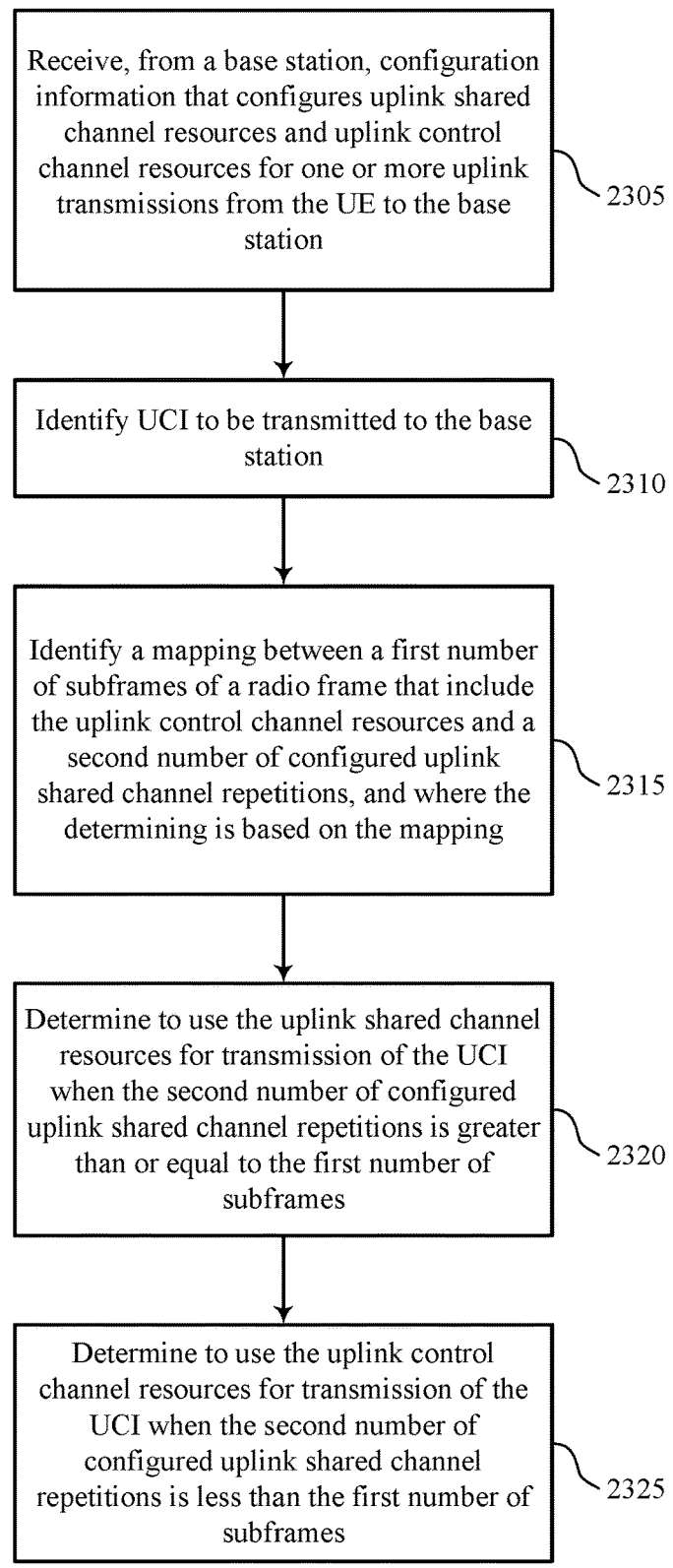

FIG. 23 shows a flowchart illustrating a method 2300 for techniques for multiplexing of uplink channels in a shared radio frequency spectrum band in accordance with aspects of the present disclosure. The operations of method 2300 may be implemented by a UE 115 or its components as described herein. For example, the operations of method 2300 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 2305 the UE 115 may receive, from a base station, configuration information that configures uplink shared channel resources and uplink control channel resources for one or more uplink transmissions from the UE to the base station. The operations of 2305 may be performed according to the methods described herein. In certain examples, aspects of the operations of 2305 may be performed by a configuration manager as described with reference to FIGS. 8 through 11.

At 2310 the UE 115 may identify UCI to be transmitted to the base station. The operations of 2310 may be performed according to the methods described herein. In certain examples, aspects of the operations of 2310 may be performed by a UCI manager as described with reference to FIGS. 8 through 11.

At 2315 the UE 115 may identify a mapping between a first number of subframes of a radio frame that include the uplink control channel resources and a second number of configured uplink shared channel repetitions, and where the determining is based on the mapping. The operations of 2315 may be performed according to the methods described herein. In certain examples, aspects of the operations of 2315 may be performed by a mapping component as described with reference to FIGS. 8 through 11.

At 2320 the UE 115 may determine to use the uplink shared channel resources for transmission of the UCI when the second number of configured uplink shared channel repetitions is greater than or equal to the first number of subframes. The operations of 2320 may be performed according to the methods described herein. In certain examples, aspects of the operations of 2320 may be performed by a uplink resource manager as described with reference to FIGS. 8 through 11.

At 2325 the UE 115 may determine to use the uplink control channel resources for transmission of the UCI when the second number of configured uplink shared channel repetitions is less than the first number of subframes. The operations of 2325 may be performed according to the methods described herein. In certain examples, aspects of the operations of 2325 may be performed by a uplink resource manager as described with reference to FIGS. 8 through 11.

Figure 24:
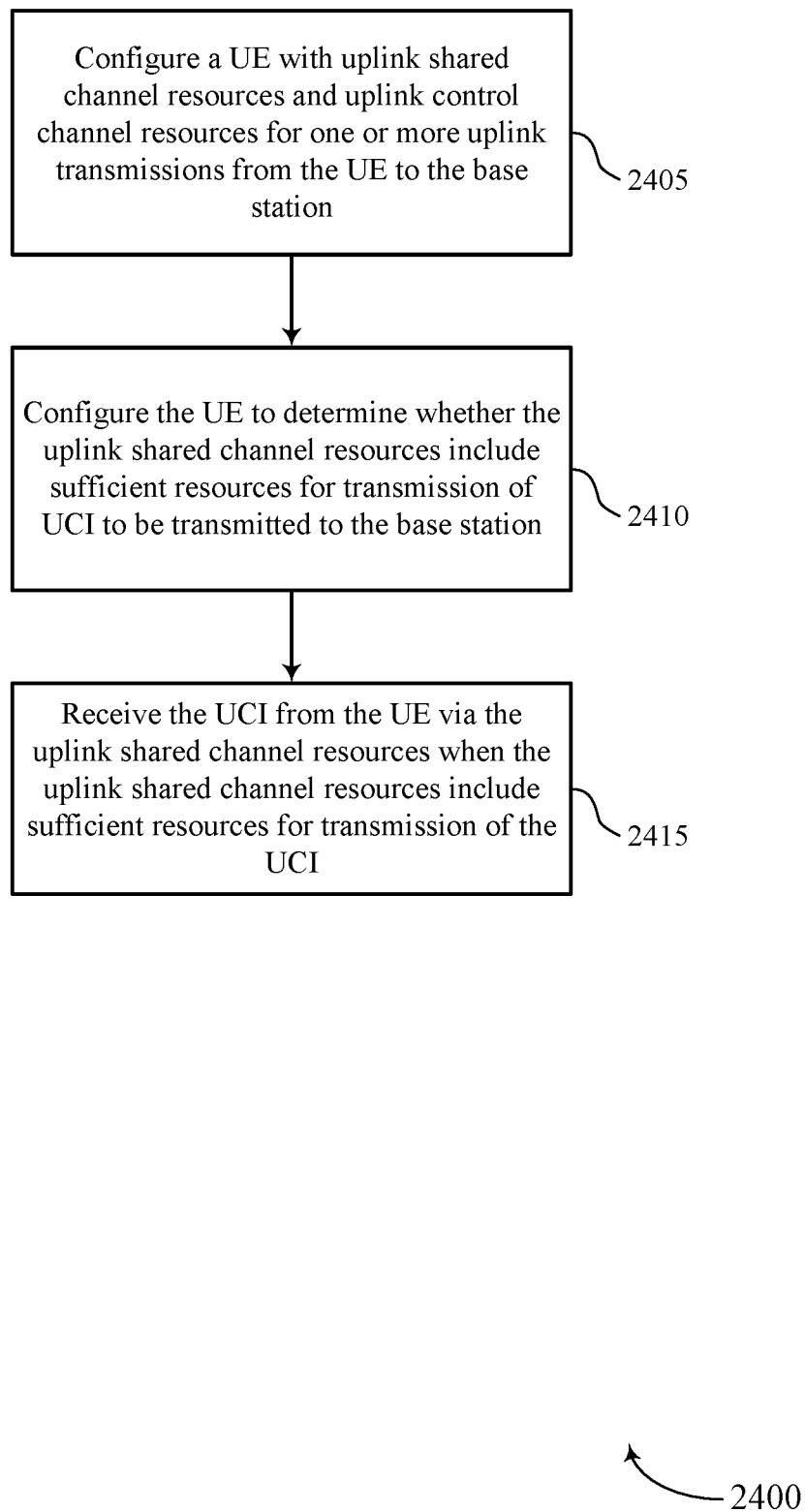

FIG. 24 shows a flowchart illustrating a method 2400 for techniques for multiplexing of uplink channels in a shared radio frequency spectrum band in accordance with aspects of the present disclosure. The operations of method 2400 may be implemented by a base station 105 or its components as described herein. For example, the operations of method 2400 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 2405 the base station 105 may configure a UE with uplink shared channel resources and uplink control channel resources for one or more uplink transmissions from the UE to the base station. The operations of 2405 may be performed according to the methods described herein. In certain examples, aspects of the operations of 2405 may be performed by a configuration manager as described with reference to FIGS. 12 through 15.

At 2410 the base station 105 may configure the UE to determine whether the uplink shared channel resources include sufficient resources for transmission of UCI to be transmitted to the base station. The operations of 2410 may be performed according to the methods described herein. In certain examples, aspects of the operations of 2410 may be performed by a uplink resource manager as described with reference to FIGS. 12 through 15.

At 2415 the base station 105 may receive the UCI from the UE via the uplink shared channel resources when the uplink shared channel resources include sufficient resources for transmission of the UCI. The operations of 2415 may be performed according to the methods described herein. In certain examples, aspects of the operations of 2415 may be performed by a UCI manager as described with reference to FIGS. 12 through 15.

Figure 25:
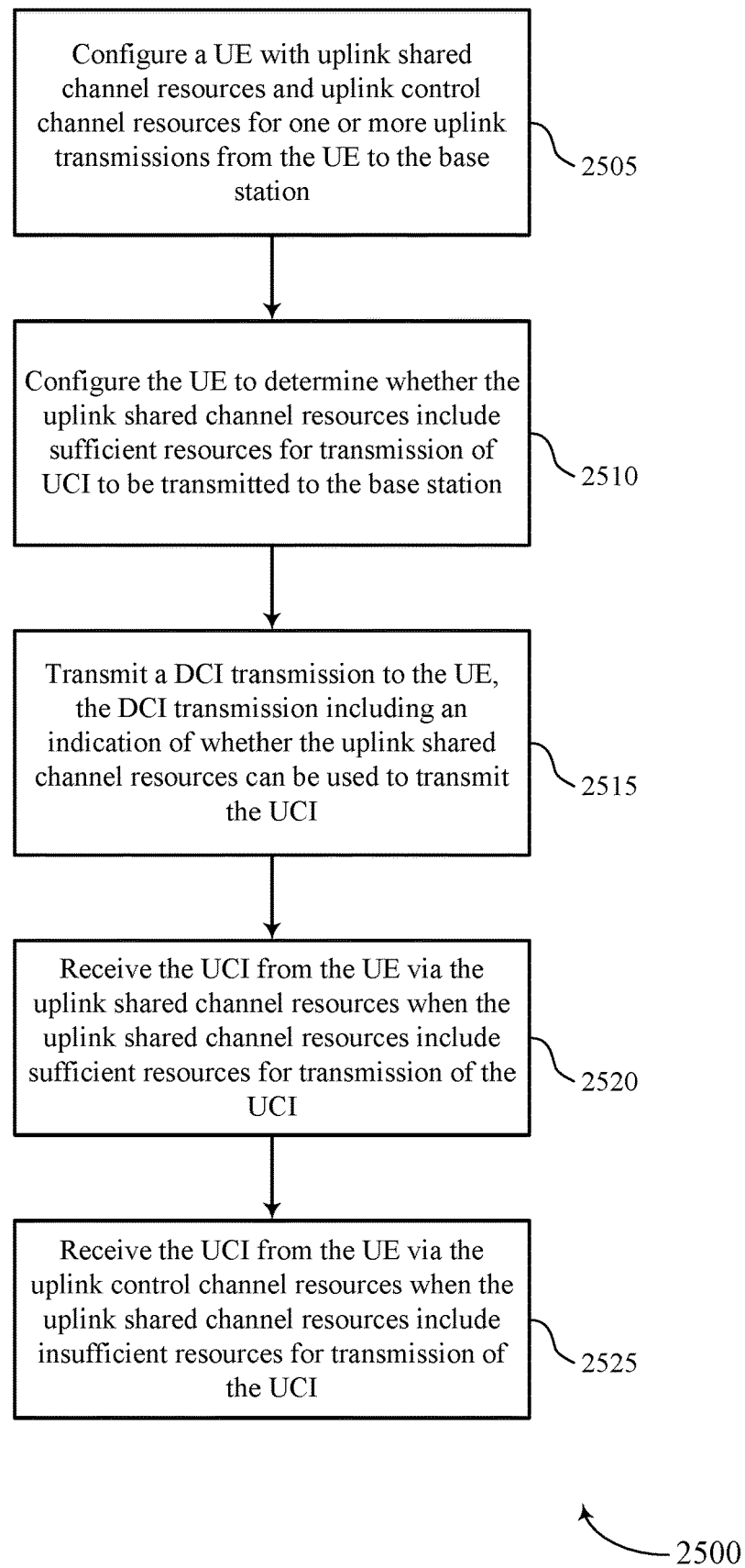

FIG. 25 shows a flowchart illustrating a method 2500 for techniques for multiplexing of uplink channels in a shared radio frequency spectrum band in accordance with aspects of the present disclosure. The operations of method 2500 may be implemented by a base station 105 or its components as described herein. For example, the operations of method 2500 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 2505 the base station 105 may configure a UE with uplink shared channel resources and uplink control channel resources for one or more uplink transmissions from the UE to the base station. The operations of 2505 may be performed according to the methods described herein. In certain examples, aspects of the operations of 2505 may be performed by a configuration manager as described with reference to FIGS. 12 through 15.

At 2510 the base station 105 may configure the UE to determine whether the uplink shared channel resources include sufficient resources for transmission of UCI to be transmitted to the base station. The operations of 2510 may be performed according to the methods described herein. In certain examples, aspects of the operations of 2510 may be performed by a uplink resource manager as described with reference to FIGS. 12 through 15.

At 2515 the base station 105 may transmit a DCI transmission to the UE, the DCI transmission including an indication of whether the uplink shared channel resources can be used to transmit the UCI. The operations of 2515 may be performed according to the methods described herein. In certain examples, aspects of the operations of 2515 may be performed by a DCI manager as described with reference to FIGS. 12 through 15.

At 2520 the base station 105 may receive the UCI from the UE via the uplink shared channel resources when the uplink shared channel resources include sufficient resources for transmission of the UCI. The operations of 2520 may be performed according to the methods described herein. In certain examples, aspects of the operations of 2520 may be performed by a UCI manager as described with reference to FIGS. 12 through 15.

At 2525 the base station 105 may receive the UCI from the UE via the uplink control channel resources when the uplink shared channel resources include insufficient resources for transmission of the UCI. The operations of 2525 may be performed according to the methods described herein. In certain examples, aspects of the operations of 2525 may be performed by a UCI manager as described with reference to FIGS. 12 through 15.

Figure 26:
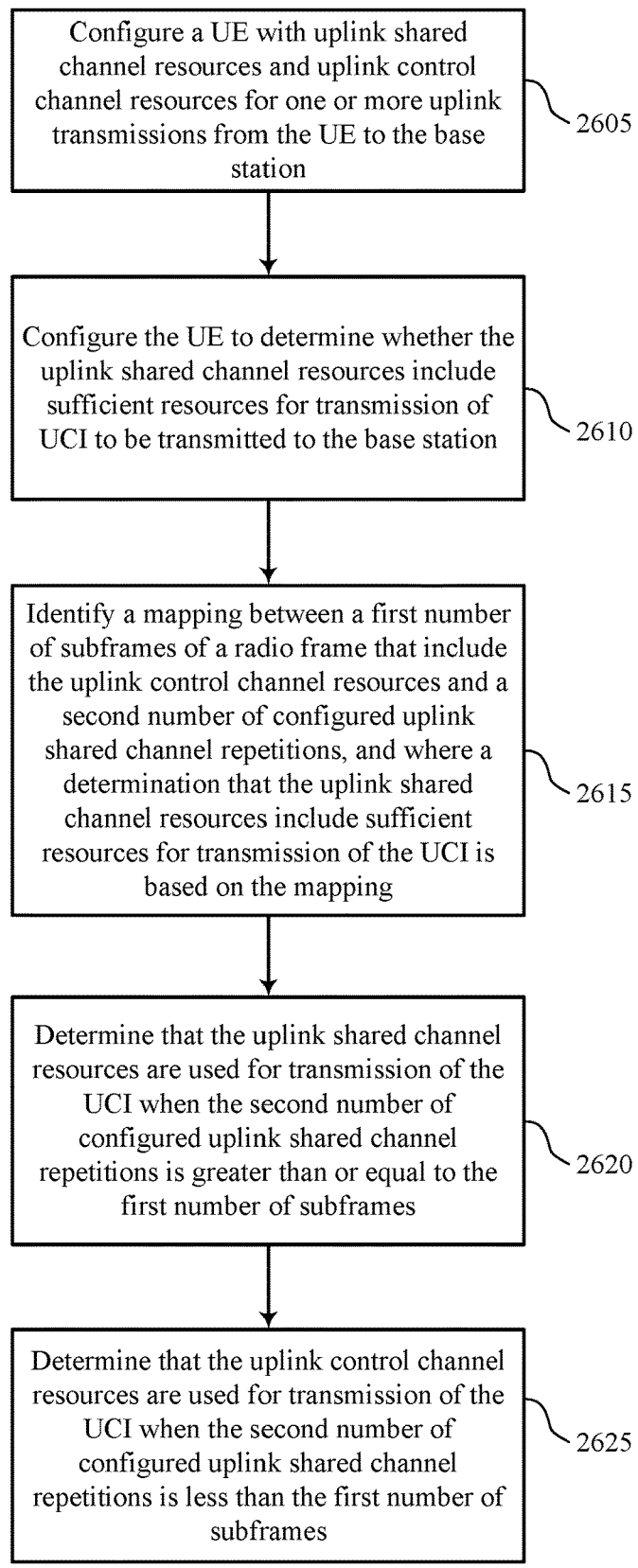

FIG. 26 shows a flowchart illustrating a method 2600 for techniques for multiplexing of uplink channels in a shared radio frequency spectrum band in accordance with aspects of the present disclosure. The operations of method 2600 may be implemented by a base station 105 or its components as described herein. For example, the operations of method 2600 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 2605 the base station 105 may configure a UE with uplink shared channel resources and uplink control channel resources for one or more uplink transmissions from the UE to the base station. The operations of 2605 may be performed according to the methods described herein. In certain examples, aspects of the operations of 2605 may be performed by a configuration manager as described with reference to FIGS. 12 through 15.

At 2610 the base station 105 may configure the UE to determine whether the uplink shared channel resources include sufficient resources for transmission of UCI to be transmitted to the base station. The operations of 2610 may be performed according to the methods described herein. In certain examples, aspects of the operations of 2610 may be performed by a uplink resource manager as described with reference to FIGS. 12 through 15.

At 2615 the base station 105 may identify a mapping between a first number of subframes of a radio frame that include the uplink control channel resources and a second number of configured uplink shared channel repetitions, and where a determination that the uplink shared channel resources include sufficient resources for transmission of the UCI is based on the mapping. The operations of 2615 may be performed according to the methods described herein. In certain examples, aspects of the operations of 2615 may be performed by a mapping component as described with reference to FIGS. 12 through 15.

At 2620 the base station 105 may determine that the uplink shared channel resources are used for transmission of the UCI when the second number of configured uplink shared channel repetitions is greater than or equal to the first number of subframes. The operations of 2620 may be performed according to the methods described herein. In certain examples, aspects of the operations of 2620 may be performed by a uplink resource manager as described with reference to FIGS. 12 through 15.

At 2625 the base station 105 may determine that the uplink control channel resources are used for transmission of the UCI when the second number of configured uplink shared channel repetitions is less than the first number of subframes. The operations of 2625 may be performed according to the methods described herein. In certain examples, aspects of the operations of 2625 may be performed by a uplink resource manager as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources;
    selecting the first set of uplink resources or the second set of uplink resources for an uplink control channel transmission to the base station based at least in part on one or more downlink transmissions from the base station; and
    transmitting the one or more uplink transmissions to the base station using the selected first set of uplink resources or second set of uplink resources, the one or more uplink transmissions comprising one or more uplink shared channel transmissions and one or more uplink control channel transmissions that are transmitted within one or more uplink subframes of a radio frame, wherein uplink shared channel transmissions within a first subframe are dropped when the first subframe includes an uplink control channel transmission.

2. The method of claim 1, wherein each of the first set of uplink resources and the second set of uplink resources have associated uplink control channel resources.

3. The method of claim 2, wherein the selection of the first set of uplink resources or the second set of uplink resources is based at least in part on a first location in time of the uplink control channel resources associated with the first set of uplink resources and a second location in time of the uplink control channel resources associated with the second set of uplink resources relative to a time boundary of an uplink transmission duration.

4. The method of claim 1, wherein the selecting comprises:
    identifying that one or more downlink transmissions from the base station are transmitted using downlink resources associated with the first set of uplink resources; and
    selecting the first set of uplink resources for the one or more uplink transmissions based at least in part on the identifying.

5. The method of claim 1, wherein the selecting comprises:
    receiving signaling in one or more downlink transmissions that indicates which of the first set of uplink resources or the second set of uplink resources is to be used for the one or more uplink transmissions.

6. The method of claim 1, wherein the one or more uplink transmissions are transmitted within a radio frame having one or more uplink portions and one or more downlink portions, and wherein each uplink portion is partitioned into the first set of uplink resources and the second set of uplink resources.

7. The method of claim 1, wherein each of the first set of uplink resources and the second set of uplink resources have uplink control channel resources, and wherein the uplink control channel resources are independently configured for each of the first set of uplink resources and the second set of uplink resources.

8. The method of claim 1, wherein the transmitting comprises:
transmitting using the selected first set of uplink resources or second set of uplink resources for each of one or more downlink-uplink parts of a radio frame based at least in part on an uplink grant received from the base station.

9. The method of claim 8, wherein the uplink grant received from the base station dynamically indicates which of the first set of uplink resources or the second set of uplink resources are to be used for each downlink-uplink part of the radio frame.

10. The method of claim 1, wherein the uplink control channel transmission to the base station includes uplink control information (UCI) comprising one or more of acknowledgement feedback that acknowledges receipt of one or more downlink transmissions or channel state information (CSI) that indicates one or more measured parameters of a channel.

11. The method of claim 1, wherein uplink shared channel transmissions within a second subframe are rate-matched around an uplink control channel transmission resource when the second subframe includes an uplink control channel transmission.

12. The method of claim 11, wherein the uplink shared channel transmissions within the second subframe are rate-matched around the uplink control channel transmission resource and one or more other uplink control channel transmission resources of one or more other transmitters.

13. The method of claim 1, wherein the one or more uplink transmissions include a sounding reference signal (SRS) transmission, and wherein the SRS transmission is transmitted in the selected set of uplink resources when a configured SRS transmission location is within the selected set of uplink resources, and wherein the scheduled SRS transmission is dropped when the configured SRS transmission location is in a different set of uplink resources than the selected set of uplink resources, and wherein the SRS transmission is transmitted in any selected set of uplink resources when the SRS location is not configured.

14. A method for wireless communication, comprising:
configuring, at a base station, a first set of uplink resources and a second set of uplink resources within a shared radio frequency spectrum band for uplink transmissions of at least one user equipment (UE), the first set of uplink resources being adjacent in time to the second set of uplink resources and each of the first set of uplink resources and the second set of uplink resources having associated uplink control channel resources;
selecting the first set of uplink resources or the second set of uplink resources for one or more uplink transmissions of a first UE based at least in part on a first location in time of the uplink control channel resources associated with the first set of uplink resources and a second location in time of the uplink control channel resources associated with the second set of uplink resources relative to a time boundary of an uplink transmission duration of the first UE; and
transmitting an indication to the first UE that indicates which of the first set of uplink resources or the second set of uplink resources are to be used for the one or more uplink transmissions, the one or more uplink transmissions comprising one or more uplink shared channel transmissions and one or more uplink control channel transmissions that are transmitted within one or more uplink subframes of a radio frame, wherein uplink shared channel transmissions within a first subframe are dropped when the first subframe includes an uplink control channel transmission.

15. The method of claim 14, further comprising:
transmitting one or more downlink transmissions to the first UE using a first set of downlink resources, and wherein the first set of downlink resources used for the one or more downlink transmissions indicates to the UE that the first set of uplink resources are to be used for the one or more uplink transmissions.

16. The method of claim 14, wherein the transmitting the indication to the first UE comprises:
transmitting signaling in one or more downlink transmissions that indicates which of the first set of uplink resources or the second set of uplink resources is to be used for the one or more uplink transmissions.

17. The method of claim 14, wherein the one or more uplink transmissions are transmitted within a radio frame having one or more uplink portions and one or more downlink portions, and wherein each uplink portion is partitioned into the first set of uplink resources and the second set of uplink resources.

18. The method of claim 14, wherein each of the first set of uplink resources and the second set of uplink resources have uplink control channel resources, and wherein the uplink control channel resources are independently configured for each of the first set of uplink resources and the second set of uplink resources.

19. The method of claim 14, wherein the configuring comprises:
configuring the first set of uplink resources and the second set of uplink resources for each of one or more downlink-uplink parts of a radio frame.

20. The method of claim 19, wherein the transmitting the indication to the first UE comprises:
transmitting one or more uplink grants to the first UE that dynamically indicate which of the first set of uplink resources or the second set of uplink resources are to be used for each downlink-uplink part of the radio frame.

21. The method of claim 14, further comprising:
receiving an uplink control channel transmission from the first UE that includes uplink control information (UCI) comprising one or more of acknowledgement feedback that acknowledges receipt of one or more downlink transmissions or channel state information (CSI) that indicates one or more measured parameters of a channel.

22. The method of claim 14, wherein uplink shared channel transmissions within a second subframe are rate-matched around an uplink control channel transmission resource when the second subframe includes an uplink control channel transmission.

23. The method of claim 22, wherein the uplink shared channel transmissions within the second subframe are rate-matched around the uplink control channel transmission resource and one or more other uplink control channel transmission resources of one or more other transmitters.

24. An apparatus for wireless communication, comprising:
a processor;
memory in electronic communication with the processor; and
instructions stored in the memory and executable by the processor to cause the apparatus to:
receive, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources;
select the first set of uplink resources or the second set of uplink resources for an uplink control channel transmission to the base station based at least in part on one or more downlink transmissions from the base station; and
transmit the one or more uplink transmissions to the base station using the selected first set of uplink resources or second set of uplink resources, the one or more uplink transmissions comprising one or more uplink shared channel transmissions and one or more uplink control channel transmissions that are transmitted within one or more uplink subframes of a radio frame, wherein uplink shared channel transmissions within a first subframe are dropped when the first subframe includes an uplink control channel transmission.

25. The apparatus of claim 24, wherein each of the first set of uplink resources and the second set of uplink resources have associated uplink control channel resources.

26. The apparatus of claim 25, wherein the selection of the first set of uplink resources or the second set of uplink resources is based at least in part on a first location in time of the uplink control channel resources associated with the first set of uplink resources and a second location in time of the uplink control channel resources associated with the second set of uplink resources relative to a time boundary of an uplink transmission duration.

27. The apparatus of claim 24, wherein the instructions to select the first set of uplink resources or the second set of uplink resources are executable by the processor to cause the apparatus to:
identify that one or more downlink transmissions from the base station are transmitted using downlink resources associated with the first set of uplink resources; and
select the first set of uplink resources for the one or more uplink transmissions based at least in part on the identifying.

28. The apparatus of claim 24, wherein the instructions to select the first set of uplink resources or the second set of uplink resources are executable by the processor to cause the apparatus to:
receive signaling in one or more downlink transmissions that indicates which of the first set of uplink resources or the second set of uplink resources is to be used for the one or more uplink transmissions.

29. The apparatus of claim 24, wherein the one or more uplink transmissions are transmitted within a radio frame having one or more uplink portions and one or more downlink portions, and wherein each uplink portion is partitioned into the first set of uplink resources and the second set of uplink resources.

30. The apparatus of claim 24, wherein each of the first set of uplink resources and the second set of uplink resources have uplink control channel resources, and wherein the uplink control channel resources are independently configured for each of the first set of uplink resources and the second set of uplink resources.

31. The apparatus of claim 24, wherein the instructions to transmit the one or more uplink transmissions are executable by the processor to cause the apparatus to:
transmit using the selected first set of uplink resources or second set of uplink resources for each of one or more downlink-uplink parts of a radio frame based at least in part on an uplink grant received from the base station.

32. The apparatus of claim 31, wherein the uplink grant received from the base station dynamically indicates which of the first set of uplink resources or the second set of uplink resources are to be used for each downlink-uplink part of the radio frame.

33. The apparatus of claim 24, wherein the uplink control channel transmission to the base station includes uplink control information (UCI) comprising one or more of acknowledgement feedback that acknowledges receipt of one or more downlink transmissions or channel state information (CSI) that indicates one or more measured parameters of a channel.

34. The apparatus of claim 24, wherein uplink shared channel transmissions within a second subframe are rate-matched around an uplink control channel transmission resource when the second subframe includes an uplink control channel transmission.

35. The apparatus of claim 34, wherein the uplink shared channel transmissions within the second subframe are rate-matched around the uplink control channel transmission resource and one or more other uplink control channel transmission resources of one or more other transmitters.

36. The apparatus of claim 24, wherein the one or more uplink transmissions include a sounding reference signal (SRS) transmission, and wherein the SRS transmission is transmitted in the selected set of uplink resources when a configured SRS location is within the selected set of uplink resources, and wherein the scheduled SRS transmission is dropped when the configured SRS transmission location is in a different set of uplink resources than the selected set of uplink resources, and wherein the SRS transmission is transmitted in any selected set of uplink resources when the SRS transmission location is not configured.

37. An apparatus for wireless communication, comprising:
a processor;
memory in electronic communication with the processor; and
instructions stored in the memory and executable by the processor to cause the apparatus to:
configure, at a base station, a first set of uplink resources and a second set of uplink resources within a shared radio frequency spectrum band for uplink transmissions of at least one user equipment (UE), the first set of uplink resources being adjacent in time to the second set of uplink resources and each of the first set of uplink resources and the second set of uplink resources having associated uplink control channel resources;
select the first set of uplink resources or the second set of uplink resources for one or more uplink transmissions of a first UE based at least in part on a first location in time of the uplink control channel resources associated with the first set of uplink resources and a second location in time of the uplink control channel resources associated with the second set of uplink resources relative to a time boundary of an uplink transmission duration of the first UE; and
transmit an indication to the first UE that indicates which of the first set of uplink resources or the second set of uplink resources are to be used for the one or more uplink transmissions, the one or more uplink transmissions comprising one or more uplink shared channel transmissions and one or more uplink control channel transmissions that are transmitted within one or more uplink subframes of a radio frame, wherein uplink shared channel transmissions within a first subframe are dropped when the first subframe includes an uplink control channel transmission.

38. The apparatus of claim 37, wherein the instructions are further executable by the processor to cause the apparatus to:
transmit one or more downlink transmissions to the first UE using a first set of downlink resources, and wherein the first set of downlink resources used for the one or more downlink transmissions indicates to the UE that the first set of uplink resources are to be used for the one or more uplink transmissions.

39. The apparatus of claim 37, wherein the instructions to transmit the indication to the first UE are executable by the processor to cause the apparatus to:
transmit signaling in one or more downlink transmissions that indicates which of the first set of uplink resources or the second set of uplink resources is to be used for the one or more uplink transmissions.

40. The apparatus of claim 37, wherein the one or more uplink transmissions are transmitted within a radio frame having one or more uplink portions and one or more downlink portions, and wherein each uplink portion is partitioned into the first set of uplink resources and the second set of uplink resources.

41. The apparatus of claim 37, wherein each of the first set of uplink resources and the second set of uplink resources have uplink control channel resources, and wherein the uplink control channel resources are independently configured for each of the first set of uplink resources and the second set of uplink resources.

42. The apparatus of claim 37, wherein the instructions to configure the first set of uplink resources are executable by the processor to cause the apparatus to:
configure the first set of uplink resources and the second set of uplink resources for each of one or more downlink-uplink parts of a radio frame.

43. The apparatus of claim 42, wherein the instructions to transmit the indication to the first UE are executable by the processor to cause the apparatus to:
transmit one or more uplink grants to the first UE that dynamically indicate which of the first set of uplink resources or the second set of uplink resources are to be used for each downlink-uplink part of the radio frame.

44. The apparatus of claim 37, wherein the instructions are further executable by the processor to cause the apparatus to:
receive an uplink control channel transmission from the first UE that includes uplink control information (UCI) comprising one or more of acknowledgement feedback that acknowledges receipt of one or more downlink transmissions or channel state information (CSI) that indicates one or more measured parameters of a channel.

45. The apparatus of claim 37, wherein uplink shared channel transmissions within a second subframe are rate-matched around an uplink control channel transmission resource when the second subframe includes an uplink control channel transmission.

46. The apparatus of claim 45, wherein the uplink shared channel transmissions within the second subframe are rate-matched around the uplink control channel transmission resource and one or more other uplink control channel transmission resources of one or more other transmitters.

47. A non-transitory computer-readable medium storing code for wireless communication, the code comprising instructions executable by a processor to:
receive, from a base station, configuration information that configures a first set of uplink resources and a second set of uplink resources within a shared radio frequency spectrum band for transmission of one or more uplink transmissions to the base station, the first set of uplink resources being adjacent in time to the second set of uplink resources;
select the first set of uplink resources or the second set of uplink resources for an uplink control channel transmission to the base station based at least in part on one or more downlink transmissions from the base station; and
transmit the one or more uplink transmissions to the base station using the selected first set of uplink resources or second set of uplink resources, the one or more uplink transmissions comprising one or more uplink shared channel transmissions and one or more uplink control channel transmissions that are transmitted within one or more uplink subframes of a radio frame, wherein uplink shared channel transmissions within a first subframe are dropped when the first subframe includes an uplink control channel transmission.

48. A non-transitory computer-readable medium storing code for wireless communication at a base station, the code comprising instructions executable by a processor to:
configure a first set of uplink resources and a second set of uplink resources within a shared radio frequency spectrum band for uplink transmissions of at least one user equipment (UE), the first set of uplink resources being adjacent in time to the second set of uplink resources and each of the first set of uplink resources and the second set of uplink resources having associated uplink control channel resources;
select the first set of uplink resources or the second set of uplink resources for one or more uplink transmissions of a first UE based at least in part on a first location in time of the uplink control channel resources associated with the first set of uplink resources and a second location in time of the uplink control channel resources associated with the second set of uplink resources relative to a time boundary of an uplink transmission duration of the first UE; and
transmit an indication to the first UE that indicates which of the first set of uplink resources or the second set of uplink resources are to be used for the one or more uplink transmissions, the one or more uplink transmissions comprising one or more uplink shared channel transmissions and one or more uplink control channel transmissions that are transmitted within one or more uplink subframes of a radio frame, wherein uplink shared channel transmissions within a first subframe are dropped when the first subframe includes an uplink control channel transmission.

* * * * *